US008472864B2

(12) United States Patent
Ueoka et al.

(10) Patent No.: US 8,472,864 B2
(45) Date of Patent: Jun. 25, 2013

(54) DATABASE CONSTRUCTION SYSTEM AND BROADCAST RECEIVING SYSTEM

(75) Inventors: Shohji Ueoka, Kobe (JP); Yuki Wakabayashi, Kobe (JP); Kazuma Fujiwara, Kobe (JP); Yuusaku Matsuda, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 295 days.

(21) Appl. No.: 12/968,967

(22) Filed: Dec. 15, 2010

(65) Prior Publication Data

US 2011/0159800 A1    Jun. 30, 2011

(30) Foreign Application Priority Data

Dec. 25, 2009  (JP) ................................ 2009-296427
Dec. 25, 2009  (JP) ................................ 2009-296428

(51) Int. Cl.
*H04W 4/06* (2009.01)
*H04H 1/00* (2006.01)

(52) U.S. Cl.
USPC ..... 455/3.01; 455/434; 455/67.11; 455/452.2

(58) Field of Classification Search
USPC ............... 455/3.01, 414.1, 456.3, 456.1, 509, 455/452.1, 452.2, 515, 67.11, 68, 434, 184.1, 455/185.1, 161.1, 3.02; 707/812; 725/135
See application file for complete search history.

(56) References Cited

U.S. PATENT DOCUMENTS

| 8,219,052 B2 * | 7/2012 | Ueoka et al. .......... 455/161.1 |
| 2002/0120943 A1 * | 8/2002 | Seto et al. .................. 725/135 |
| 2002/0126780 A1 * | 9/2002 | Oshima et al. ............ 375/347 |

FOREIGN PATENT DOCUMENTS

| JP | A-2000-131360 | 5/2000 |
| JP | A-2002-141819 | 5/2002 |
| JP | A-2005-252965 | 9/2005 |
| JP | A-2008-78875  | 4/2008 |

* cited by examiner

*Primary Examiner* — John J Lee
(74) *Attorney, Agent, or Firm* — Oliff & Berridge, PLC

(57) ABSTRACT

A database construction system constructs a database storing broadcast channels which are receivable in each area. A receiving unit receives probe information from a plurality of broadcast receiving apparatuses, the probe information including reception intensity of each of the broadcast channels and positions of the broadcast receiving apparatuses. An information storage unit stores the probe information received by the receiving unit. An extracting unit extracts the probe information with the same broadcast channel as that of new probe information, which is the probe information newly received by the receiving unit, among the probe information transmitted from a transmission area of the new probe information, from the information storage unit. A determining unit determines whether the new probe information is valid on the basis of the reception intensity included in the probe information extracted by the extracting unit and the reception intensity included in the new probe information. A database update unit updates the database using the new probe information that is determined to be valid by the determining unit.

11 Claims, 29 Drawing Sheets

FIG. 4

PROBE HISTORY

| VEHICLE | TYPE OF VEHICLE | DATE AND TIME WHEN PROBE INFORMATION IS RECEIVED | KIND OF BROADCAST | FREQUENCY | RECEPTION INTENSITY | POSITION |
|---|---|---|---|---|---|---|
| N1 | I | 2009.01.01.12:00 | AM | A | XXX | LATITUDE ...N, LONGITUDE ...E |
| ... | ... | 2009.02.01.12:00 | ... | B | YYY | ... |
| ... | ... | ... | FM | ... | ... | ... |
| ... | ... | ... | ... | ... | ... | ... |
| N2 | ... | ... | AM | ... | BBB | ... |
| ... | ... | ... | ... | ... | ... | ... |
| ... | ... | ... | FM | ... | ... | ... |
| ... | ... | ... | ... | ... | ... | ... |
| ... | II | | | | | |

*FIG. 5*

OPTIONAL DB

| MESH ID | TYPE OF VEHICLE | KIND OF BROADCAST | FREQUENCY | RECEPTION INTENSITY |
|---------|-----------------|-------------------|-----------|---------------------|
| xxx | I | AM | A | XXX |
| ⋮ | ⋮ | ⋮ | B | YYY |
| ⋮ | ⋮ | FM | C | ZZZ |
| ⋮ | ⋮ | ⋮ | D | AAA |
| ⋮ | ⋮ | ⋮ | ⋮ | ⋮ |
| yyy | II | AM | E | EEE |
| ⋮ | ⋮ | ⋮ | F | FFF |
| ⋮ | ⋮ | ⋮ | G | GGG |
| ⋮ | ⋮ | ⋮ | ⋮ | ⋮ |

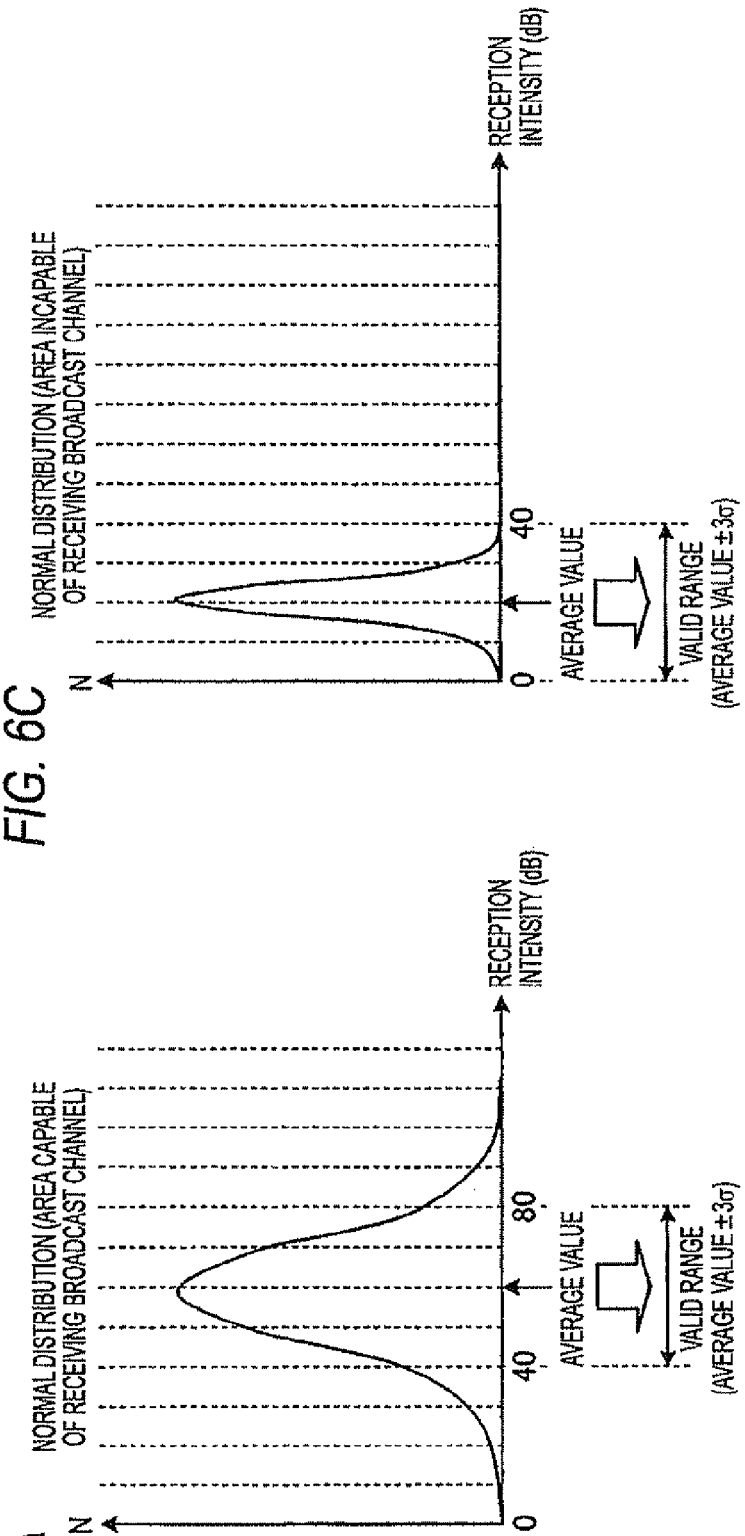

FIG. 15

PROBE HISTORY

| VEHICLE | TYPE OF VEHICLE | DATE AND TIME WHEN PROBE INFORMATION IS RECEIVED | KIND OF BROADCAST | FREQUENCY | RECEPTION INTENSITY | POSITION |
|---|---|---|---|---|---|---|
| N1 | α | 2009.01.01.12:00 | AM | A | XXX | LATITUDE...N, LONGITUDE...E |
| ... | ... | 2009.02.01.12:00 | ... | B | YYY | ... |
| ... | ... | ... | FM | ... | ... | ... |
| ... | ... | ... | ... | ... | ... | ... |
| N2 | ... | ... | AM | ... | BBB | ... |
| ... | ... | ... | ... | ... | ... | ... |
| ... | ... | ... | FM | ... | ... | ... |
| ... | ... | ... | ... | ... | ... | ... |
| ... | β | ... | ... | ... | ... | ... |

FIG. 16

OPTIONAL DB

| MESH ID | TYPE OF VEHICLE | KIND OF BROADCAST | FREQUENCY | RECEPTION INTENSITY |
|---------|-----------------|-------------------|-----------|---------------------|
| xxx | α | AM | A | XXX |
| ⋮ | ⋮ | ⋮ | B | YYY |
| ⋮ | ⋮ | FM | C | ZZZ |
| ⋮ | ⋮ | ⋮ | D | AAA |
| ⋮ | ⋮ | ⋮ | ⋮ | ⋮ |
| yyy | β | AM | E | EEE |
| ⋮ | ⋮ | ⋮ | F | FFF |
| ⋮ | ⋮ | ⋮ | G | GGG |
| ⋮ | ⋮ | ⋮ | ⋮ | ⋮ |

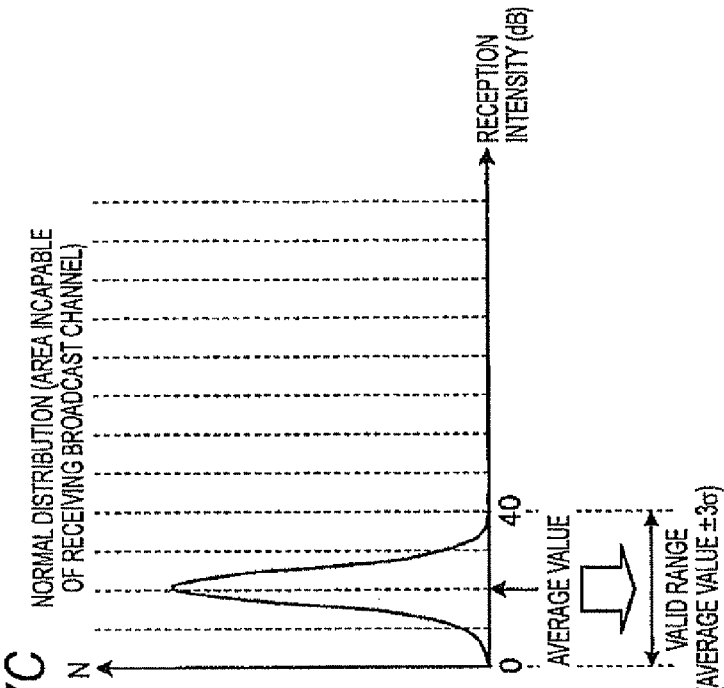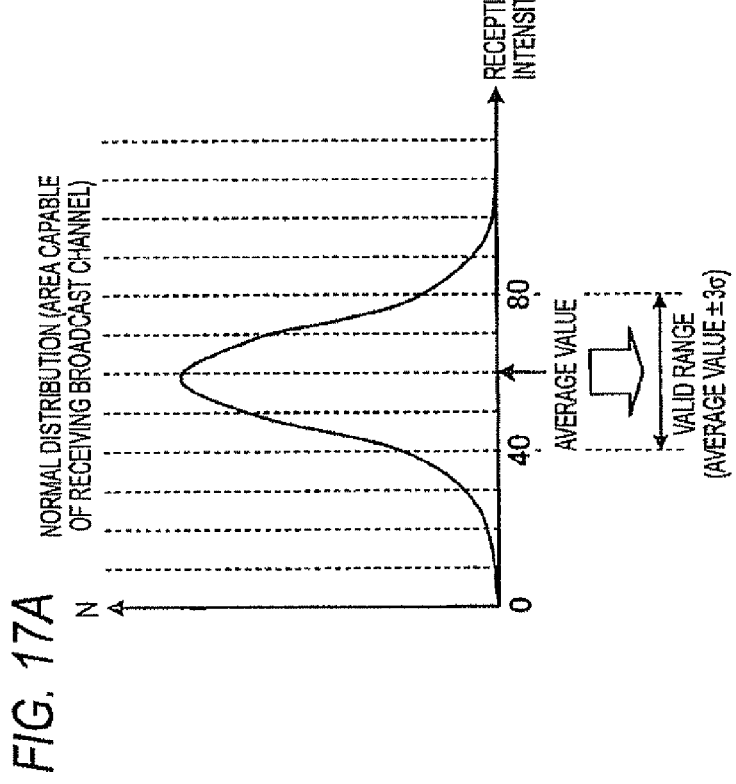

AREA INFORMATION (X MESH)

| MESH ID | KIND OF BROADCAST | FREQUENCY | RECEPTION INTENSITY | CORRESPONDING CODE |
|---------|-------------------|-----------|---------------------|--------------------|
| xxx | AM | A | XXX | 001 |
| | | B | YYY | 002 |
| ⋮ | ⋮ | ⋮ | ⋮ | ⋮ |

STATION NAME LIST (X MESH)

| CORRESPONDING CODE | BROADCAST STATION NAME | READING 1 | READING 2 |
|--------------------|------------------------|-----------|-----------|
| 001 | KANSAI RADIO | KANSAI RADIO | AM KANSAI |
| 002 | FIRST BROADCAST | DAIICHI HOUSOU | |
| ⋮ | ⋮ | ⋮ | |

DATABASE CONSTRUCTION SYSTEM AND BROADCAST RECEIVING SYSTEM

The disclosure of Japanese Patent Applications No. 2009-296427 and No. 2009-296428 filed on Dec. 25, 2009, including specifications, drawings and claims are incorporated herein by reference in its entireties.

BACKGROUND

The present invention relates to a database construction system, and more particularly, to a database construction system capable of improving the reliability of a database storing broadcast channels that can be received in each area.

The present invention also relates to a broadcast receiving system, and more particularly, to a broadcast receiving system in which an in-vehicle apparatus receiving a broadcast can set an appropriate broadcast channel in each traveling area of a vehicle.

A broadcasting system has been proposed in which a predetermined server provides information related to a broadcast channel that can be received in the place where there is a broadcast receiving apparatus. According to the broadcasting system, the broadcast receiving apparatus can easily set a receivable broadcast channel on the basis of the information received from the predetermined server without independently searching for the broadcast channel.

In order to form the broadcasting system, it is necessary to construct a database storing the broadcast channels that can be received in each area. For example, JP-A-2005-252965 discloses a technique for constructing the database storing the broadcast channels that can be received in each area.

In the technique disclosed in JP-A-2005-252965, a predetermined aggregation center receives information indicating the reception conditions related to the broadcast channels that are received by each broadcast receiving apparatus and the position of the broadcast receiving apparatus. Then, the aggregation center stores the received information so as to be associated with each area corresponding to the position included in the information, thereby constructing a database storing the broadcast channels that can be received in each area.

In the technique disclosed in JP-A-2005-252965, for example, the investigator does not need to examine the reception conditions in each area, and the aggregation center can easily construct a database storing the broadcast channels that can be received in each area only by storing the reception conditions and the position of each broadcast receiving apparatus transmitted from each broadcast receiving apparatus so as to be associated with each other.

However, the technique disclosed in JP-A-2005-252965 has a problem in that the reliability of the constructed database is low.

For example, the broadcast receiving apparatus whose broadcast receiving function does not work transmits the reception conditions indicating that a broadcast channel cannot be received to the aggregation center even though the broadcast receiving apparatus is in the area in which it can actually receive the broadcast channel. However, the aggregation center constructs a database using the incorrect reception conditions. As a result, the reliability of the database is reduced.

As such, in the technique according to the related art, the information used by the aggregation center to construct a database includes information with low reliability. As a result, the reliability of the constructed database is reduced.

In some cases, an in-vehicle broadcast receiving apparatus cannot receive the broadcast that has been received until now due to the traveling of the vehicle. A technique has been proposed in which the broadcast receiving apparatus automatically changes the broadcast channel to another broadcast channel capable of receiving a broadcast with the same content as that of the broadcast which has been received up until now.

For example, JP-A-2002-141819 discloses a technique in which the broadcast receiving apparatus acquires information related to the electric field intensity (reception intensity) of broadcasts provided by each broadcasting station from an arbitrary broadcasting station in advance and stores the acquired information.

In the technique disclosed in JP-A-2002-141819, when the broadcast receiving apparatus cannot receive a broadcast during the traveling of the vehicle, the broadcast receiving apparatus automatically changes the broadcast channel to another broadcast channel capable of receiving a broadcast with the same content as that of the broadcast that cannot be received, on the basis of the information acquired from the broadcasting station. Therefore, the broadcast receiving apparatus can continuously receive the broadcast with the same content during the traveling of the vehicle.

However, when the technique disclosed in JP-A-2002-141819 is used, there is a concern that the in-vehicle apparatus cannot set an appropriate broadcast channel in each traveling area of the vehicle.

That is, in the technique disclosed in JP-A-2002-141819, whether the in-vehicle apparatus can set an appropriate broadcast channel in each traveling area of the vehicle depends on the reliability of the information transmitted from the broadcasting station.

When the reliability of the information transmitted from the broadcasting station is low, in some cases, the in-vehicle apparatus cannot set an appropriate broadcast channel in each traveling area of the vehicle.

Therefore, it is considered that the information of the database obtained by the technique disclosed in JP-A-2005-252965 is used instead of the information transmitted from the broadcasting station. However, in this case, the database disclosed in JP-A-2005-252965 has a problem in reliability as described above.

As such, in the related art, it is difficult for the in-vehicle apparatus to set an appropriate broadcast channel in each traveling area.

SUMMARY

It is therefore a first object of at least one embodiment of the present invention to provide a database construction system capable of improving the reliability of a database storing broadcast channels that can be received in each area.

It is a second object of at least one embodiment of the present invention to provide a broadcast receiving system in which an in-vehicle apparatus receiving a broadcast can set an appropriate broadcast channel in each traveling area of a vehicle.

In order to achieve at lease one of the above-described objects, according to a first aspect of the embodiments of the present invention, there is provided a database construction system that constructs a database storing broadcast channels which are receivable in each area, the data base construction system comprising: a receiving unit that receives probe information from a plurality of broadcast receiving apparatuses, the probe information including reception intensity of each of the broadcast channels and positions of the broadcast receiving apparatuses; an information storage unit that stores the probe information received by the receiving unit; an extracting unit that extracts the probe information with the same broadcast channel as that of new probe information, which is the probe information newly received by the receiving unit, among the probe information transmitted from a transmission area of the new probe information, from the information storage unit; a determining unit that determines whether the new probe information is valid on the basis of the reception intensity included in the probe information extracted by the extracting unit and the reception intensity included in the new probe information; and a database update unit that updates the database using the new probe information that is determined to be valid by the determining unit.

According to the first aspect of the embodiments of the present invention, a database construction system that constructs a database storing broadcast channels that are receivable in each area stores all probe information received from each broadcast receiving apparatus as a probe history once, determines the validity of each probe information stored as the probe history, deletes the probe information determined to be invalid, and updates the database using only the probe information determined to be valid. Therefore, it is possible to improve the reliability of the database storing the broadcast channel that can be received in each area.

According to a second aspect of the embodiments of the present invention, there is provided a broadcast receiving system comprising: a plurality of in-vehicle apparatuses each of which is provided in a vehicle and receives a broadcast; and an information providing apparatus that transmits area information related to broadcast channels which are receivable in a traveling area of the vehicle to the in-vehicle apparatuses, wherein the information providing apparatus includes: a receiving unit that receives probe information including reception intensity of each of the broadcast channels and a position of the vehicle from the in-vehicle apparatuses; a determining unit that determines validity of probe information which is newly received by the receiving unit, on the basis of the reception intensity included in the newly received probe information and the reception intensity included in the probe information which has been received from the traveling area from which the newly received probe information is transmitted; and an update unit that updates the area information using the new probe information determined to be valid by the determining unit, and wherein each of the in-vehicle apparatuses includes: an area information receiving unit that receives the area information from the information providing apparatus; an area determining unit that determines the traveling area of the vehicle; and a setting unit that sets the broadcast channels which are receivable in the traveling area determined by the area determining unit, on the basis of the area information received by the area information receiving unit.

According to the second aspect of the embodiments of the present invention, the in-vehicle apparatus sets a broadcast channel that is receivable in each traveling area of the vehicle, on the basis of the area information updated using only the probe information determined to be valid by the information providing apparatus. Therefore, it is possible to set an appropriate broadcast channel in each traveling area.

BRIEF DESCRIPTION OF THE DRAWINGS

In the accompanying drawings:

FIG. 4 is a diagram illustrating an example of a probe history according to the first embodiment;

FIG. 5 is a diagram illustrating an example of an optimal DB according to the first embodiment;

FIGS. 6A to 6D are diagrams illustrating an example of a procedure of creating a normal distribution and setting a valid range and a procedure of determining the validity of reception intensity according to the first embodiment;

FIG. 15 is a diagram illustrating an example of a probe history according to the second embodiment;

FIG. 16 is a diagram illustrating an example of an optimal DB according to the second embodiment;

FIGS. 17A to 17D are diagrams illustrating an example of a procedure of creating a normal distribution and setting a valid range and a procedure of determining the validity of reception intensity according to the second embodiment;

DETAILED DESCRIPTION OF THE EMBODIMENTS

First Embodiment

Figure 1:
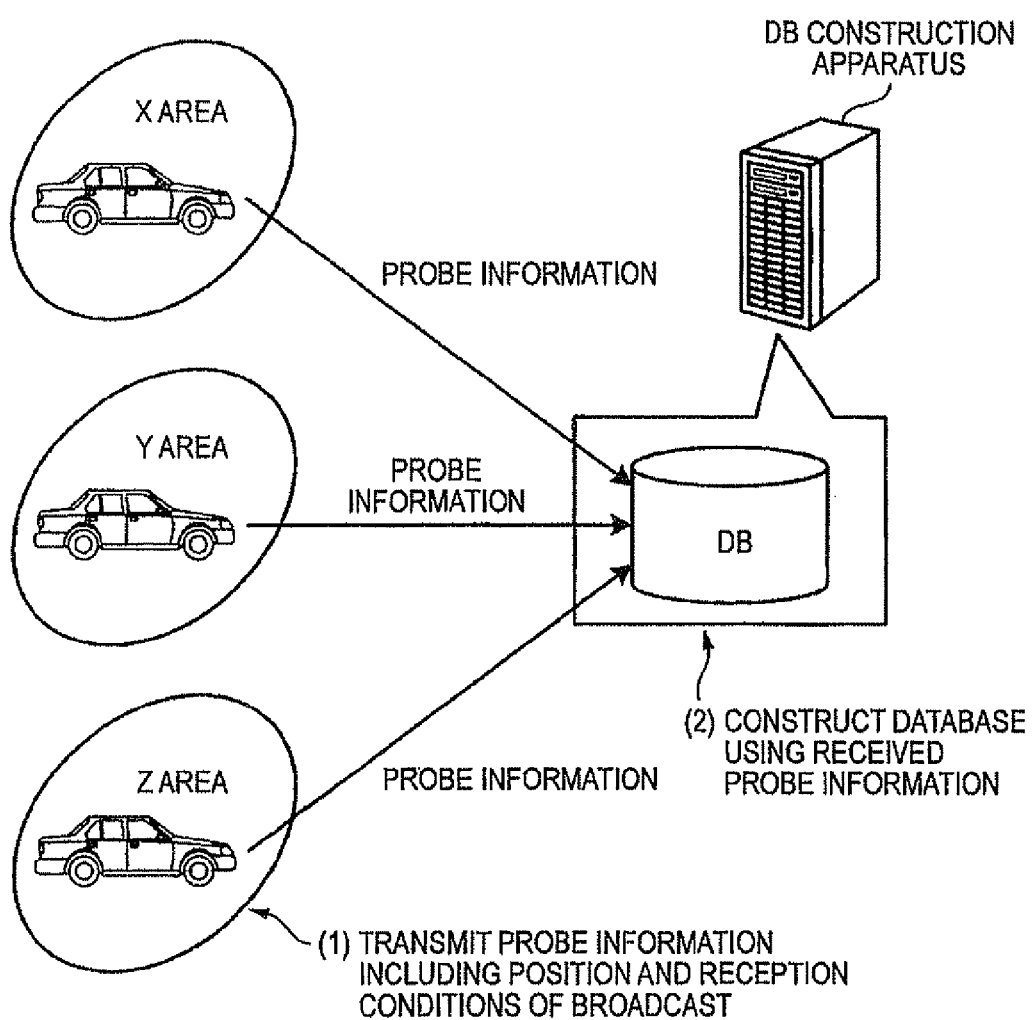
FIG. 1 is a diagram illustrating the outline of a DB construction method according to the related art.
Figure 2:
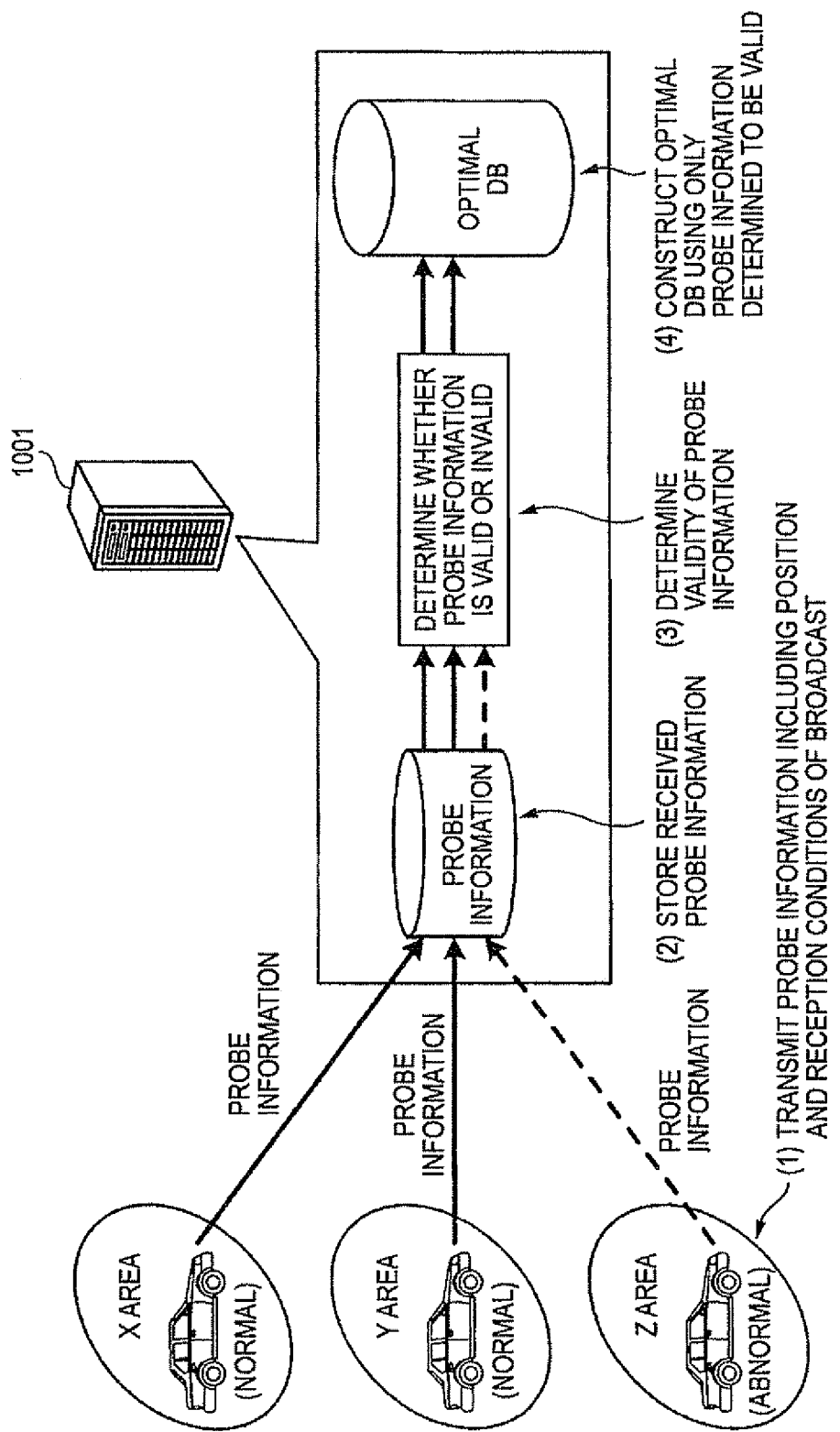
FIG. 2 is a diagram illustrating a DB construction method according to the present invention.

Hereinafter, a database (hereinafter, referred to as a "DB") construction system according to first embodiment of the present invention will be described in detail with reference to the accompanying drawings. First, the outline of a DB construction method according to the present invention will be described in comparison with the DB construction method according to the related art before the first embodiment is described in detail. FIG. 1 is a diagram illustrating the outline of the DB construction method according to the related art and FIG. 2 is a diagram illustrating the DB construction method according to the present invention.

Next, a DB construction system that receives probe information including the reception intensity of a broadcast and the position of a vehicle from a broadcast receiving apparatus (hereinafter, referred to as an "in-vehicle apparatus") provided in the vehicle and constructs a DB storing a broadcast channel which can be received in each area on the basis of the received probe information will be described as an example.

Information used by the DB construction system according to the present invention to construct a DB is not limited to the probe information received from the in-vehicle apparatus, but may be information including, for example, the reception intensity of signals received from a fixed broadcast receiving apparatus, such as a home television set, and the installation position of the broadcast receiving apparatus.

In the following description, the term "area" indicates each divided area divided from an area on the map. In the following description, each area has a square shape having one side with a length of 1 km (so-called three-dimensional mesh), but the length of one side of each area is not limited to 1 km. In addition, the shape of each area is not limited to a square.

As shown in FIG. 1, in the DB construction method according to the related art, each in-vehicle apparatus provided in the vehicles that travel in different areas, such as an X area, a Y area, and a Z area, transmits the probe information to a DB construction apparatus provided in a predetermined aggregation center (see (1) of FIG. 1).

Each probe information transmitted to the DB construction apparatus includes the position of each vehicle and the reception conditions of the broadcast channel received by the in-vehicle apparatus. The DB construction apparatus constructs a DB storing the broadcast channel that can be received in each area, using the probe information received from each in-vehicle apparatus (see (2) of FIG. 1).

For example, it is assumed that the probe information received by the DB construction apparatus is transmitted from the vehicle that travels in the X area and the probe information includes the reception conditions related to a predetermined broadcast channel.

When the probe information is received, the DB construction apparatus stores the predetermined broadcast channel as a broadcast channel that can be received in the X area in the DB. Then, the DB construction apparatus similarly determines whether to receive other broadcast channels from each area on the basis of the received other probe information, and stores the broadcast channels in the DB, thereby constructing a DB storing the broadcast channel that can be received in each area.

However, since the DB is constructed by the DB construction unit shown in FIG. 1 without considering a variation in the reception environment in each area over time or the state of each in-vehicle apparatus, the reliability of the DB is low.

For example, when a new multistory building that has not existed before is constructed in the X area, a local area in which a predetermined broadcast channel cannot be received is likely to be formed in the vicinity of the multistory building. The in-vehicle apparatus in the vehicle that travels in the area in which a predetermined broadcast channel cannot be received transmits probe information indicating that a predetermined broadcast channel cannot be received in the X area to the DB construction apparatus.

Therefore, there is a concern that the DB construction apparatus will store erroneous information indicating that the predetermined broadcast channel cannot be received in the X area in the DB even when it can actually receive the predetermined broadcast channel in most of the X area.

For example, in the case of the in-vehicle apparatus whose broadcast receiving function does not work, even though the in-vehicle apparatus is in the X area in which a predetermined broadcast channel can be actually received, it transmits probe information indicating that a predetermined broadcast channel cannot be received in the X area to the DB construction apparatus.

Therefore, there is a concern that, when receiving the probe information from the in-vehicle apparatus whose receiving function does not work, the DB construction apparatus will store, in the DB, information indicating that a predetermined broadcast channel cannot be received in the X area even though the predetermined broadcast channel can be actually received in the X area.

As such, in the DB construction method according to the related art, the DB construction apparatus determines all probe information received from each in-vehicle apparatus to be valid and uses them to construct the DB. Therefore, the reliability of the constructed DB is reduced.

The DB construction method according to the present invention determines whether each probe information received from each in-vehicle apparatus to be valid and constructs an optimal DB using only the probe information that is determined to be valid.

Specifically, in the DB construction method according to the present invention, as shown in FIG. 2, each in-vehicle apparatus transmits probe information to the DB construction apparatus 1001 (see (1) of FIG. 2). Here, a case in which the broadcast receiving functions of the in-vehicle apparatuses provided in the vehicles that travel in the X area and the Y area are normal and the broadcast receiving function of the in-vehicle apparatus provided in the vehicle that travels in the Z area is abnormal (does not work) will be described as an example.

When receiving probe information from each in-vehicle apparatus, a DB construction apparatus 1001 shown in FIG. 2 stores the received probe information once (see (2) of FIG. 2). Then, when receiving new probe information (hereinafter, referred to as "new probe information"), the DB construction apparatus 1001 determines the validity of the new probe information on the basis of reception intensity included in the new probe information and reception intensity included in another probe information that has been transmitted from the same area as that from which the new probe information is transmitted and then stored (see (3) of FIG. 2). Here, another probe information relates to the same broadcast channel as the new probe information.

In the example shown in FIG. 2, the DB construction apparatus 1001 determines the new probe information received from the X area and the Y area to be valid and determines the new probe information received from the Z area to be invalid. Then, the DB construction apparatus 1001 constructs an optimal DB using only the probe information determined to be valid, that is, the new probe information transmitted from the X area and the Y area, among the new probe information (see (4) of FIG. 2).

As such, since the DB construction apparatus 1001 constructs the optimal DB using only the probe information that has been determined to be valid among the new probe information, the content of probe information with low reliability, such as the probe information received from the in-vehicle apparatus whose receiving function is abnormal, is not reflected to the optimal DB. Therefore, according to the present invention, it is possible to improve the reliability of the optimal DB constructed by the DB construction apparatus 1001.

In the DB construction method according to the present invention, the DB construction apparatus 1001 determines again the validity of the probe information that has been determined to be invalid using all probe information stored in the DB construction apparatus 1001. As a result of the redetermination, when the probe information that has been determined to be invalid is determined to be valid, it is used to construct an optimal DB. The redetermination will be described in detail below with reference to FIGS. 7A to 7C.

Next, a DB construction system according to a first embodiment to which the DB construction method according to the present invention is applied will be described in detail. In the following first embodiment, a DB construction system that receives probe information including the reception intensity of a broadcast and the position of a vehicle from an in-vehicle apparatus and constructs a DB storing a broadcast channel which can be received in each area on the basis of the received probe information will be described as an example.

The DB construction method according to the present invention can be applied to various DB construction systems that structure a DB storing a broadcast channel which can be received in each area. For example, the DB construction methods according to the present invention can also be applied to a DB construction system in which a fixed broadcast receiving apparatus, such as a home television set, constructs a DB storing a broadcast channel which can be received in each area.

Figure 3:
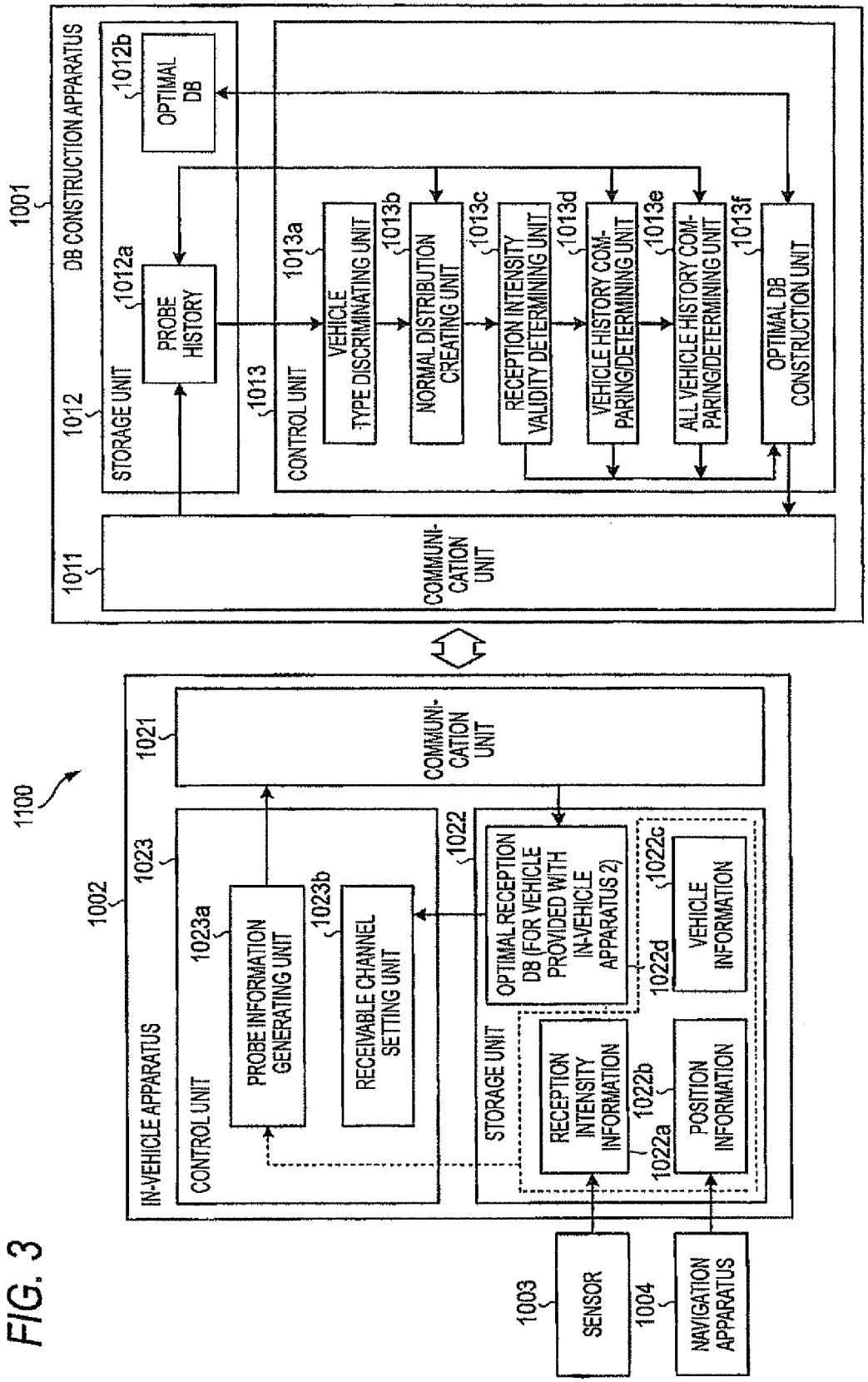
FIG. 3 is a block diagram illustrating the structure of a DB construction system according to a first embodiment of the present invention.

FIG. 3 is a block diagram illustrating the structure of a DB construction system 1100 according to the first embodiment. As shown in FIG. 3, the DB construction system 1100 includes a DB construction apparatus 1001 and an in-vehicle apparatus 1002. FIG. 3 shows only components required to describe the characteristics of the DB construction system 1100, but does not show general components.

As shown in FIG. 3, the in-vehicle apparatus 1002 includes a communication unit 1021, a storage unit 1022, and a control unit 1023. The communication unit 1021 is a communication interface that transmits/receives various kinds of information to/from the DB construction apparatus 1001. The storage unit 1022 is a non-volatile information storage device that stores reception intensity information 1022a, position information 1022b, vehicle information 1022c, and an optimal reception DB (for a vehicle provided with the in-vehicle apparatus 1002) 1022d.

The reception intensity information 1022a indicates the reception intensity of each broadcast channel received by the in-vehicle apparatus 1002. The reception intensity information 1022a is input from a sensor 1003 that detects the electric field intensity of a broadcast signal received by an antenna.

The position information 1022b indicates the traveling position of a vehicle (for a vehicle provided with the in-vehicle apparatus 1002). The position information 1022b is input from a navigation apparatus 1004 having a function of specifying the position of the vehicle provided with the in-vehicle apparatus 1002 on the basis of signals received from a GPS (Global Positioning System) satellite and map information that is stored in advance.

The vehicle information 1022c includes information capable of identifying each vehicle, such as the registration number of the vehicle, and information capable of identifying the type or grade of each vehicle. The optimal reception DB (for the vehicle provided with the in-vehicle apparatus 1002) 1022d stores the broadcast channels that can be received in the traveling area of the vehicle. The optimal reception DB (for the vehicle provided with the in-vehicle apparatus 1002) 1022d is information received from the DB construction apparatus 1001.

The control unit 1023 is a processing unit that controls the overall operation of the in-vehicle apparatus 1002 and is formed by an information processing device including, for example, a CPU (Central Processing Unit), a ROM (Read Only Memory), and a RAM (Random Access Memory).

The control unit 1023 includes a probe information generating unit 1023a and a receivable channel setting unit 1023b which are implemented by the CPU to read various kinds of programs from the ROM and execute the programs using the RAM as a work area.

The probe information generating unit 1023a is a processing unit that reads the reception intensity information 1022a, the position information 1022b, and the vehicle information 1022c of each broadcast channel from the storage unit 1022 and associates the read information for each broadcast channel, thereby generating probe information for each broadcast channel. The probe information generating unit 1023a transmits the generated probe information to the DB construction apparatus 1001 through the communication unit 1021 periodically or at the time when a broadcast is received.

The receivable channel setting unit 1023b is a processing unit that reads the optimal reception DB (for the vehicle provided with the in-vehicle apparatus 1002) 1022d from the storage unit 1022 and automatically sets a broadcast channel that can be received in the traveling area of the vehicle. For example, when the broadcast channel that has been received cannot be received due to the movement of the vehicle, the receivable channel setting unit 1023b performs a network following process for automatic switching to a broadcast channel that can be received in a destination area.

When the traveling area in which the in-vehicle apparatus is positioned is changed due to the movement of the vehicle, the receivable channel setting unit 1023b performs an area preset process of automatically setting, in the background, a plurality of broadcast channels that can be received in a destination area.

The DB construction apparatus 1001 includes a communication unit 1011, a storage unit 1012, and a control unit 1013. The communication unit 1011 is a communication interface that transmits/receives various kinds of information to/from the in-vehicle apparatus 1002. The storage unit 1012 is a non-volatile information storage device that stores a probe history 1012a and an optimal DB 1012b.

Next, the probe history 1012a and the optimal DB 1012b stored in the storage unit 1012 will be described with reference to FIGS. 4 and 5. FIG. 4 is a diagram illustrating an example of the probe history 1012a according to the first embodiment and FIG. 5 is a diagram illustrating an example of the optimal DB 1012b according to the first embodiment.

First, the probe history 1012a will be described with reference to FIG. 4 and then the optimal DB 1012b will be described with reference to FIG. 5. The probe history 1012a according to the first embodiment is obtained by storing the probe information received by the DB construction apparatus 1001 from each in-vehicle apparatus 1002 and the reception history of the probe information.

Specifically, as shown in FIG. 4, information capable of identifying the vehicle provided with the in-vehicle apparatus 1002 receiving the probe information, information capable of identifying the type of vehicle, the date and time when the probe information is received, the kind, frequency, and reception intensity of broadcast of the broadcast channel received by the in-vehicle apparatus 1002, and the position of the in-vehicle apparatus 1002 are stored in the probe history 1012a so as to be associated with each other.

For example, information indicating that the probe information is received from a vehicle N1 of type I at 12 o'clock on Jan. 1, 2009 and information indicating that the in-vehicle apparatus 1002 transmitting the probe information receives an AM broadcast with a frequency A at a reception intensity of XXX at latitude . . . N and longitude . . . E at the same date and time are stored in the probe history 1012a.

Next, the optimal DB 1012b stored in the storage unit 1012 will be described with reference to FIG. 5. The optimal DB 1012b is constructed by the control unit 1013 and stores broadcast channels that can be received in each area. In particular, the optimal DB 1012b is constructed using only the probe information that is determined to be valid, among a plurality of probe information received by the DB construction apparatus 1001 from each in-vehicle apparatus 1002.

Specifically, as shown in FIG. 5, in the optimal DB 1012b, a mesh ID for identifying each area, the type of vehicle that can receive a broadcast in an area corresponding to the mesh ID, the kind of broadcast that can be received, the frequency of each broadcast channel, and the reception intensity of a broadcast in an area corresponding to the mesh ID are stored so as to be associated with each other.

For example, as shown in FIG. 5, the optimal DB 1012b stores, for example, information indicating that the in-vehicle apparatus provided in the vehicle of type I can receive a broadcast channel of an AM broadcast with a frequency A at a reception intensity of XXX in the area corresponding to the mesh ID xxx.

When receiving information indicating the position of the vehicle and a request to distribute the optimal DB 1012b from the in-vehicle apparatus 1002, the DB construction apparatus 1001 transmits the optimal DB 1012b corresponding to the area including the received position of the vehicle as the optimal reception DB (for the vehicle provided with the in-vehicle apparatus 1002) 1022d to the in-vehicle apparatus 1002.

Returning to FIG. 3, the control unit 1013 of the DB construction apparatus 1001 includes a vehicle type discriminating unit 1013a, a normal distribution creating unit 1013b, a reception intensity validity determining unit 1013c, a vehicle history comparing/determining unit 1013d, an all-vehicle history comparing/determining unit 1013e, and an optimal DB construction unit 1013f.

The vehicle type discriminating unit 1013a is a processing unit that reads new probe information from the probe history 1012a and discriminates the type of vehicle, which is the transmission source of the new probe information, on the basis of vehicle information included in the new probe information. The vehicle type discriminating unit 1013a outputs the discrimination result of the type of vehicle and the new probe information to the normal distribution creating unit 1013b.

The normal distribution creating unit 1013b is a processing unit that creates a normal distribution used by the reception intensity validity determining unit 1013c to determine the validity of the reception intensity included in the new probe information. The normal distribution creating unit 1013b reads, from the probe history 1012a, a group of probe information with the same broadcast channel as that of the new probe information among the probe information transmitted from the same transmission area as that from which the new probe information is transmitted.

Then, the normal distribution creating unit 1013b creates a normal distribution for the reception intensity of a broadcast signal in the area from which the new probe information is transmitted, using the group of probe information read from the probe history 1012a.

Then, the normal distribution creating unit 1013b sets a valid range, which is a standard used by the reception intensity validity determining unit 1013c to determine the validity of the reception intensity included in the new probe information, in the created normal distribution. The normal distribution creating unit 1013b outputs the normal distribution having the valid range set therein and the new probe information to the reception intensity validity determining unit 1013c. A procedure of creating the normal distribution and a procedure of setting the valid range in the normal distribution creating unit 1013b will be described in detail below with reference to FIGS. 6A to 6D.

The reception intensity validity determining unit 1013c compares the normal distribution for the reception intensity created by the normal distribution creating unit 1013b with the reception intensity included in the new probe information to determine the validity of the reception intensity in the new probe information.

When it is determined that the reception intensity is valid, the reception intensity validity determining unit 1013c outputs the new probe information to the optimal DB construction unit 1013f. When it is determined that the reception intensity is invalid, the reception intensity validity determining unit 1013c outputs the new probe information to the vehicle history comparing/determining unit 1013d.

Next, the procedure of creating the normal distribution and setting the valid range in the normal distribution creating unit 1013b and the procedure of determining the validity of the reception intensity in the new probe information in the reception intensity validity determining unit 1013c will be described with reference to FIGS. 6A to 6D. FIGS. 6A to 6D are diagrams illustrating an example of the procedure of creating the normal distribution and setting the valid range and the procedure of determining the validity of the reception intensity according to the first embodiment.

When creating the normal distribution, first, the normal distribution creating unit 1013b searches for probe information that is transmitted from the vehicle whose type is the same as that of the vehicle which transmits new probe information in the same area as that from which the new probe information is transmitted, from the probe history 1012a, and reads the searched probe information group. The probe information read from the probe history 1012a by the normal distribution creating unit 1013b relates to the same broadcast channel as that of the new probe information.

Then, as shown in FIG. 6A, the normal distribution creating unit 1013b creates a distribution function for the reception intensity included in each probe information read from the probe history 1012a as the normal distribution. FIG. 6A shows a normal distribution when a broadcast channel corresponding to the new probe information can be received in the area from which the new probe information is transmitted.

As shown in FIG. 6A, since the normal distribution is created on the basis of the probe information transmitted from the area in which a broadcast channel corresponding to the new probe information can be received, the distribution of the reception intensity is concentrated on about 60 dB where a broadcast channel can be received relatively well.

That is, when the receiving function of the in-vehicle apparatus 1002 transmitting the new probe information is normal, the reception intensity of the new probe information is approximately 60 dB. Therefore, the normal distribution creating unit 1013b sets the range of the average value (here, 60 dB)±σ of the reception intensity in the normal distribution as the valid range. For example, the normal distribution creating unit 1013b sets a range of 40 dB to 80 dB as the valid range.

When the normal distribution creating unit 1013b creates the normal distribution and sets the valid range in this way, the reception intensity validity determining unit 1013c determines whether the reception intensity of the new probe information is within the valid range, thereby determining the validity of the reception intensity included in the new probe information.

Specifically, as shown in FIG. 6B, for example, when the reception intensity of the new probe information received from the in-vehicle apparatus 1002 of a vehicle N1 is 50 dB, the reception intensity validity determining unit 1013c determines that the receiving function of the in-vehicle apparatus 1002 provided in the vehicle N1 is normal since the reception intensity is within the valid range and determines that the reception intensity of the new probe information is valid.

Similarly, the reception intensity validity determining unit 1013c determines that the receiving function of the in-vehicle apparatus 1002 provided in a vehicle N2 is normal and determines that the reception intensity of the new probe information is valid.

Meanwhile, when the reception intensity of the new probe information received from the in-vehicle apparatus 1002 of a vehicle N3 is 25 dB, the reception intensity validity determining unit 1013c determines that the receiving function of the in-vehicle apparatus 1002 provided in the vehicle N3 is abnormal since the reception intensity is beyond the valid range and determines that the reception intensity of the new probe information is invalid.

Then, the reception intensity validity determining unit 1013c outputs the new probe information having the reception intensity determined to be valid to the optimal DB construction unit 1013f, and outputs the new probe information having the reception intensity determined to be invalid to the vehicle history comparing/determining unit 1013d.

When a broadcast channel corresponding to the new probe information cannot be received in the area from which the new probe information has been transmitted, the normal distribution creating unit 1013b creates a distribution function shown in FIG. 6C as the normal distribution.

As shown in FIG. 6C, since the normal distribution is created on the basis of the probe information transmitted from the area in which a broadcast channel corresponding to the new probe information cannot be received, the distribution of the reception intensity is concentrated on about 30 dB where a broadcast cannot be normally received.

That is, when the receiving function of the in-vehicle apparatus 1002 transmitting the new probe information is normal, the reception intensity of the new probe information is approximately 30 dB. Therefore, the normal distribution creating unit 1013b sets the range of the average value (here, 30 dB)±σ of the reception intensity in the normal distribution as the valid range. For example, the normal distribution creating unit 1013b sets a range of 0 dB to 40 dB as the valid range.

When the normal distribution creating unit 1013b creates the normal distribution and sets the valid range in this way, the reception intensity validity determining unit 1013c determines whether the reception intensity of the new probe information is within the valid range, thereby determining the validity of the reception intensity included in the new probe information.

That is, as shown in FIG. 6D, the reception intensity validity determining unit 1013c determines that the receiving function of the in-vehicle apparatuses 1002 provided in the vehicles N1 and N2 is normal and determines that the reception intensity of the new probe information is valid. In addition, the reception intensity validity determining unit 1013c determines that the reception intensity detecting function of the in-vehicle apparatus 1002 provided in the vehicle N3 is abnormal and determines that the reception intensity of the new probe information is invalid.

Then, the reception intensity validity determining unit 1013c outputs the new probe information having the reception intensity determined to be valid to the optimal DB construction unit 1013f, and outputs the new probe information having the reception intensity determined to be invalid to the vehicle history comparing/determining unit 1013d.

The probe information read from the probe history 1012a by the normal distribution creating unit 1013b to create the normal distribution may be probe information that is transmitted from a sub-area including the transmission position of the new probe information among the sub-areas divided from the area from which the new probe information is transmitted.

As such, when the probe information which is transmitted from the sub-area including the transmission position of the new probe information is read, the normal distribution creating unit 1013b can create a normal distribution, assuming a receiving environment narrower than the area from which the new probe information is transmitted.

When creating the normal distribution, the normal distribution creating unit 1013b reads the probe information that is transmitted from the vehicle whose type is the same as that of the vehicle which transmits new probe information from the probe history 1012a. However, probe information to be read is not limited to the probe information transmitted from the same type of vehicle.

For example, when there is a relatively small difference in reception sensitivity for each type of vehicle, the normal distribution creating unit 1013b may read probe information transmitted from all types of vehicles including the type of vehicle that transmits the new probe information from the probe history 1012a.

As such, when the normal distribution creating unit 1013b reads the probe information transmitted from all types of vehicles from the probe history 1012a, it can create the normal distribution using probe information greater than that transmitted from the same type of vehicle. Therefore, the reliability of the normal distribution created by the normal distribution creating unit 1013b is improved.

Returning to FIG. 3, the vehicle history comparing/determining unit 1013d is a processing unit that compares the current and previous reception conditions of the in-vehicle apparatus 1002 transmitting the new probe information in the same area to estimate the failure of the in-vehicle apparatus 1002 transmitting the new probe information or a variation in the receiving environment over time.

When it is estimated that there is a failure in the vehicle apparatus 1002 transmitting the new probe information and the receiving environment varies over time, the vehicle history comparing/determining unit 1013d outputs the new probe information to the all-vehicle history comparing/determining unit 1013e.

On the other hand, when it is estimated that there is no failure in the vehicle apparatus 1002 transmitting the new probe information or the receiving environment does not vary over time, the vehicle history comparing/determining unit 1013d outputs the new probe information to the optimal DB construction unit 1013f. The determination procedure of the vehicle history comparing/determining unit 1013d will be described in detail below with reference to FIGS. 7A to 7C.

The all-vehicle history comparing/determining unit 1013e is a processing unit that compares the reception conditions of broadcasts by the in-vehicle apparatus 1002 transmitting the new probe information with the reception conditions of broadcasts by all in-vehicle apparatuses 1002 that transmit probe information related to the same broadcast channel from the same traveling area as that from which the new probe information is transmitted, thereby determining whether there is a failure in the in-vehicle apparatus 1002 transmitting the new probe information.

When it is determined that there is a failure in the in-vehicle apparatus 1002 transmitting the new probe information, the all-vehicle history comparing/determining unit 1013e deletes the new probe information from the probe history 1012a. On the other hand, when it is determined that there is no failure in the in-vehicle apparatus 1002 transmitting the new probe information, the all-vehicle history comparing/determining unit 1013e outputs the new probe information to the optimal DB construction unit 1013f.

Figure 7A:
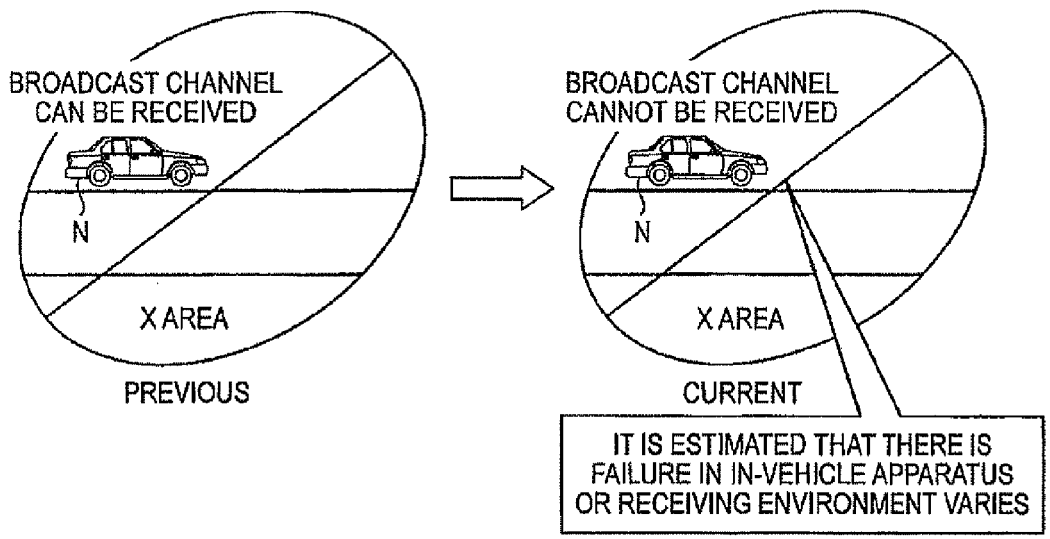
FIGS. 7A to 7C are diagrams illustrating determination procedures performed by a vehicle history comparing/determining unit and an all-vehicle history comparing/determining unit according to the first embodiment.
Figure 7B:
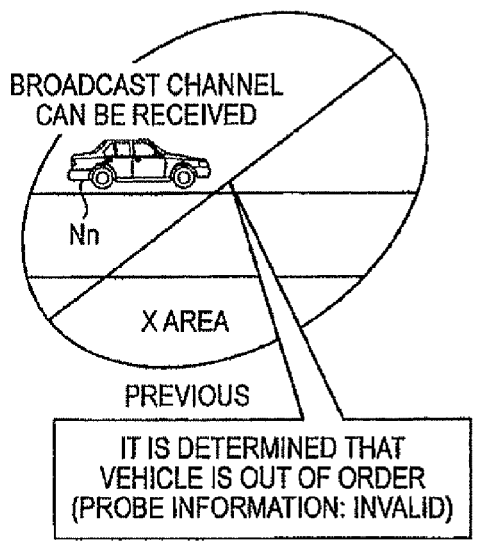
Figure 7C:
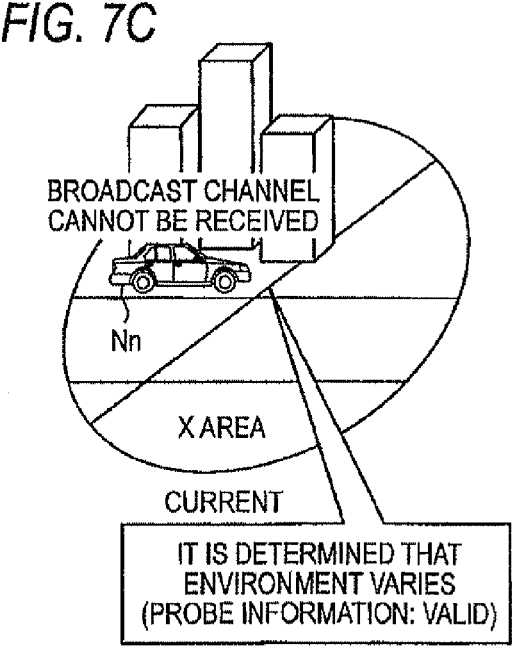

Next, the determination procedures of the vehicle history comparing/determining unit 1013d and the all-vehicle history comparing/determining unit 1013e will be described with reference to FIGS. 7A to 7C. FIGS. 7A to 7C are diagrams illustrating the determination procedures of the vehicle history comparing/determining unit 1013d and the all-vehicle history comparing/determining unit 1013e according to the first embodiment. In FIGS. 7A to 7C, the vehicle provided with the in-vehicle apparatus 1002 transmitting the new probe information is referred to as a vehicle N and vehicles other than the vehicle N are referred to as other vehicles Nn.

When the new probe information having the reception intensity determined to be invalid is input from the reception intensity validity determining unit 1013c, the vehicle history comparing/determining unit 1013d reads probe information related to the same broadcast channel previously transmitted from the same area by the in-vehicle apparatus 1002 of the vehicle N from the probe history 1012a.

When the reception intensity of the probe information read from the probe history 1012a is equal to or greater than a predetermined receivable threshold value, the vehicle history comparing/determining unit 1013d determines that a broadcast channel could be received in the past. On the other hand, when the reception intensity of the probe information read from the probe history 1012a is less than the predetermined receivable threshold value, the vehicle history comparing/ determining unit 1013d determines that a broadcast channel could not be received in the past.

When the current and previous reception conditions of the in-vehicle apparatus 1002 of the vehicle N are different from each other, the vehicle history comparing/determining unit 1013d estimates that there is a failure in the in-vehicle apparatus 1002 of the vehicle N or the receiving environment varies in the area from which the new probe information is transmitted.

For example, as shown in FIG. 7A, it is assumed that the vehicle history comparing/determining unit 1013d determines that the in-vehicle apparatus 1002 of the vehicle N could receive a broadcast channel corresponding to the new probe information in the X area in the past.

Meanwhile, as shown in FIG. 7A, it is assumed that the vehicle history comparing/determining unit 1013d determines that the in-vehicle apparatus 1002 of the vehicle N cannot currently receive a broadcast channel corresponding to the new probe information in the X area.

As such, when the broadcast of the broadcast channel that could be received in the same X area in the past cannot be currently received, the in-vehicle apparatus 1002 of the vehicle N is likely to be out of order or the receiving environment is likely to vary in the X area.

The reason for this is that, for example, when a multistory building that has not existed in the X area is newly constructed in the X area or when the in-vehicle apparatus 1002 of the vehicle N that has not been out of order is currently out of order, the current and previous reception conditions are different from each other.

In addition, when it is determined that a broadcast of the broadcast channel that could not be received in the X area in the past can be currently received, the in-vehicle apparatus 1002 of the vehicle N is likely to be out of order or the receiving environment is likely to vary in the X area.

The reason for this is that, for example, when the multistory building that has existed in the X area is demolished in the X area, the current and previous reception conditions are different from each other. In addition, when the normal in-vehicle apparatus 1002 that transmitted valid probe information indicating that a broadcast channel could not be received erroneously transmits probe information indicating that a broadcast channel can be received in the same traveling area due to a failure, the current and previous reception conditions are different from each other.

Therefore, when the current and previous reception conditions of the vehicle N are different from each other, the vehicle history comparing/determining unit 1013d determines that the new probe information is not valid and outputs the new probe information to the all-vehicle history comparing/determining unit 1013e.

On the other hand, when the current and previous reception conditions of the vehicle N are identical to each other, the vehicle history comparing/determining unit 1013d determines that the new probe information is valid and outputs the new probe information to the optimal DB construction unit 1013f.

Next, the operation of the all-vehicle history comparing/determining unit 1013e will be described with reference to FIGS. 7B and 7C. When the new probe information is input from the vehicle history comparing/determining unit 1013d, the all-vehicle history comparing/determining unit 1013e reads the probe information that is currently (lately) transmitted from the in-vehicle apparatus 1002 of anther vehicle Nn in the X area from the probe history 1012a. The probe information read from the probe history 1012a relates to the same broadcast channel as that of the new probe information.

The term "current (latest)" means a period (for example, within one week) before a predetermined period has elapsed from the date and time when the new probe information has been transmitted. In the first embodiment, a case in which the all-vehicle history comparing/determining unit 1013e reads the probe information that is currently (lately) transmitted from the in-vehicle apparatus 1002 of anther vehicle Nn is given as an example. However, the all-vehicle history comparing/determining unit 1013e may read the probe information that is transmitted lately from the in-vehicle apparatus 1002 of the vehicle N.

Then, the all-vehicle history comparing/determining unit 1013e compares the reception intensity of the new probe information with a predetermined receivable threshold value to determine the current reception conditions of the in-vehicle apparatus 1002 of the vehicle N. In addition, the all-vehicle history comparing/determining unit 1013e compares the reception intensity of the probe information read from the probe history 1012a with the predetermined receivable threshold value to determine the current reception conditions of the in-vehicle apparatus 1002 of another vehicle Nn.

As a result, when the current reception conditions of the in-vehicle apparatus 1002 of the vehicle N in the X area are not identical to the current reception conditions of the in-vehicle apparatus 1002 of another vehicle Nn in the X area, the all-vehicle history comparing/determining unit 1013e determines that there is a failure in the in-vehicle apparatus 1002 of the vehicle N.

On the other hand, when the current reception conditions of the in-vehicle apparatus 1002 of the vehicle N in the X area are identical to the current reception conditions of the in-vehicle apparatus 1002 of another vehicle Nn in the X area, the all-vehicle history comparing/determining unit 1013e determines that the receiving environment in the X area has been changed.

For example, when the vehicle N cannot receive a broadcast in the X area and another vehicle Nn can currently receive the same broadcast channel as the vehicle N in the X area as shown in FIG. 7B, the all-vehicle history comparing/determining unit 1013e determines that there is a failure in the in-vehicle apparatus 1002 of the vehicle N.

On the other hand, when the vehicle N cannot receive a broadcast in the X area and another vehicle Nn cannot currently receive the same broadcast channel as the vehicle N in the X area as shown in FIG. 7C, the all-vehicle history comparing/determining unit 1013e determines that the receiving environment in the X area has been changed due to, for example, the construction of a multistory building.

When it is determined that there is a failure in the in-vehicle apparatus 1002 of the vehicle N, the all-vehicle history comparing/determining unit 1013e determines that the new probe information is invalid and deletes the new probe information from the probe history 1012a. When it is determined that the receiving environment in the X area is changed, the all-vehicle history comparing/determining unit 1013e determines that the new probe information is valid and outputs the new probe information to the optimal DB construction unit 1013f.

As such, the all-vehicle history comparing/determining unit 1013e deletes the invalid new probe information transmitted from the in-vehicle apparatus 1002 that is clearly out of order from the probe history 1012a. Therefore, it is possible to improve the reliability of the normal distribution to be created by the normal distribution creating unit 1013b.

Returning to FIG. 3, the optimal DB construction unit 1013f is a processing unit that constructs the optimal DB 1012b shown in FIG. 5 while updating the optimal DB 1012b, using only the new probe information that has been input from the reception intensity validity determining unit 1013c, the vehicle history comparing/determining unit 1013d, and the all vehicle history comparing/determining unit 1013e and then determined to be valid.

Figure 8:
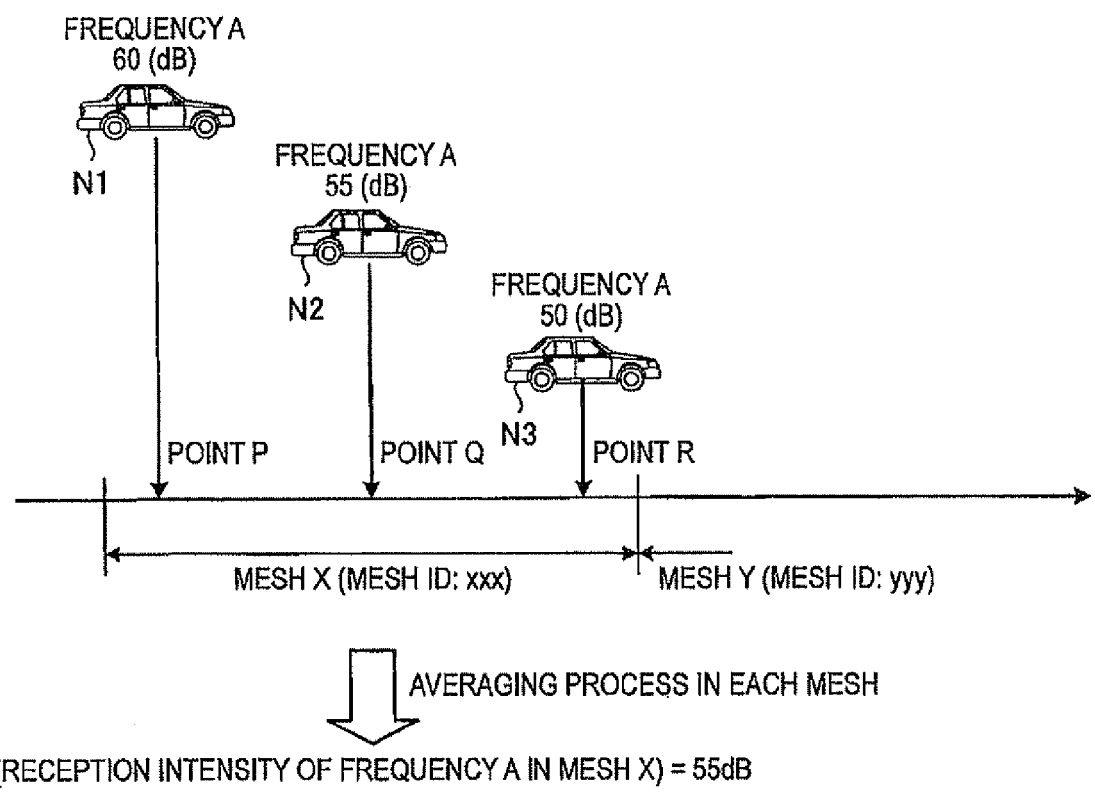
FIG. 8 is a diagram illustrating an example of a procedure of constructing an optimal DB according to the first embodiment.

Next, a procedure of constructing the optimal DB 1012b in the optimal DB construction unit 1013f will be described with reference to FIG. 8. FIG. 8 is a diagram illustrating an example of the procedure of constructing the optimal DB 1012b according to the first embodiment. The optimal DB construction unit 1013f averages the reception intensities of a plurality of input new probe information for each broadcast channel in each area to determine the reception intensity of each broadcast channel in each traveling area.

For example, as shown in FIG. 8, a case in which the new probe information transmitted from the in-vehicle apparatuses 1002 of three vehicles N1, N2, and N3 in an area corresponding to a mesh X identified by the mesh ID xxx is input to the optimal DB construction unit 1013f will be described.

As shown in FIG. 8, it is assumed that new probe information indicating that a broadcast channel with a frequency A is received at a reception intensity of 60 dB is transmitted from the in-vehicle apparatus 1002 of the vehicle N1 at a point P. In addition, it is assumed that new probe information indicating that a broadcast channel with the frequency A is received at a reception intensity of 55 dB is transmitted from the in-vehicle apparatus 1002 of the vehicle N2 at a point Q. It is assumed that new probe information indicating that a broadcast channel with the frequency A is received at a reception intensity of 50 dB is transmitted from the in-vehicle apparatus 1002 of the vehicle N3 at a point R.

When the new probe information transmitted from the in-vehicle apparatuses 1002 of the three vehicles N1, N2, and N3 that travel in an area corresponding to the X mesh is input, the optimal DB construction unit 1013f averages the reception intensities in three new probe information to determine the reception intensity related to the area of the mesh X.

The optimal DB construction unit 1013f determines 55 dB, which is the average value of three reception intensities of 60 dB, 55 dB, and 50 dB, as the reception intensity related to the broadcast channel with the frequency A in the area of the mesh X and stores the reception intensity in the optimal DB 1012b.

As such, since the optimal DB construction unit 1013f stores a value obtained by averaging a plurality of reception intensities transmitted from the same area as the reception intensity of each broadcast channel in each area in the optimal DB 1012b, it is possible to reduce the amount of information managed in the optimal DB 1012b.

During the construction of the optimal DB 1012b, when there is a local region capable of receiving a predetermined broadcast channel in a given area, the optimal DB construction unit 1013f calculates the percentage of the area of the region capable of receiving a broadcast channel in the area of the traveling area.

When the calculated percentage is less than a predetermined value, the optimal DB construction unit 1013f constructs the optimal DB 1012b such that, even when there is a local region capable of receiving a broadcast channel in a given area, the broadcast channel which can be received only in the local region capable of receiving a broadcast channel cannot be received. In this way, it is possible to ensure that the broadcast channel determined to be receivable in the optimal DB 1012b can be reliably received.

Figure 9:
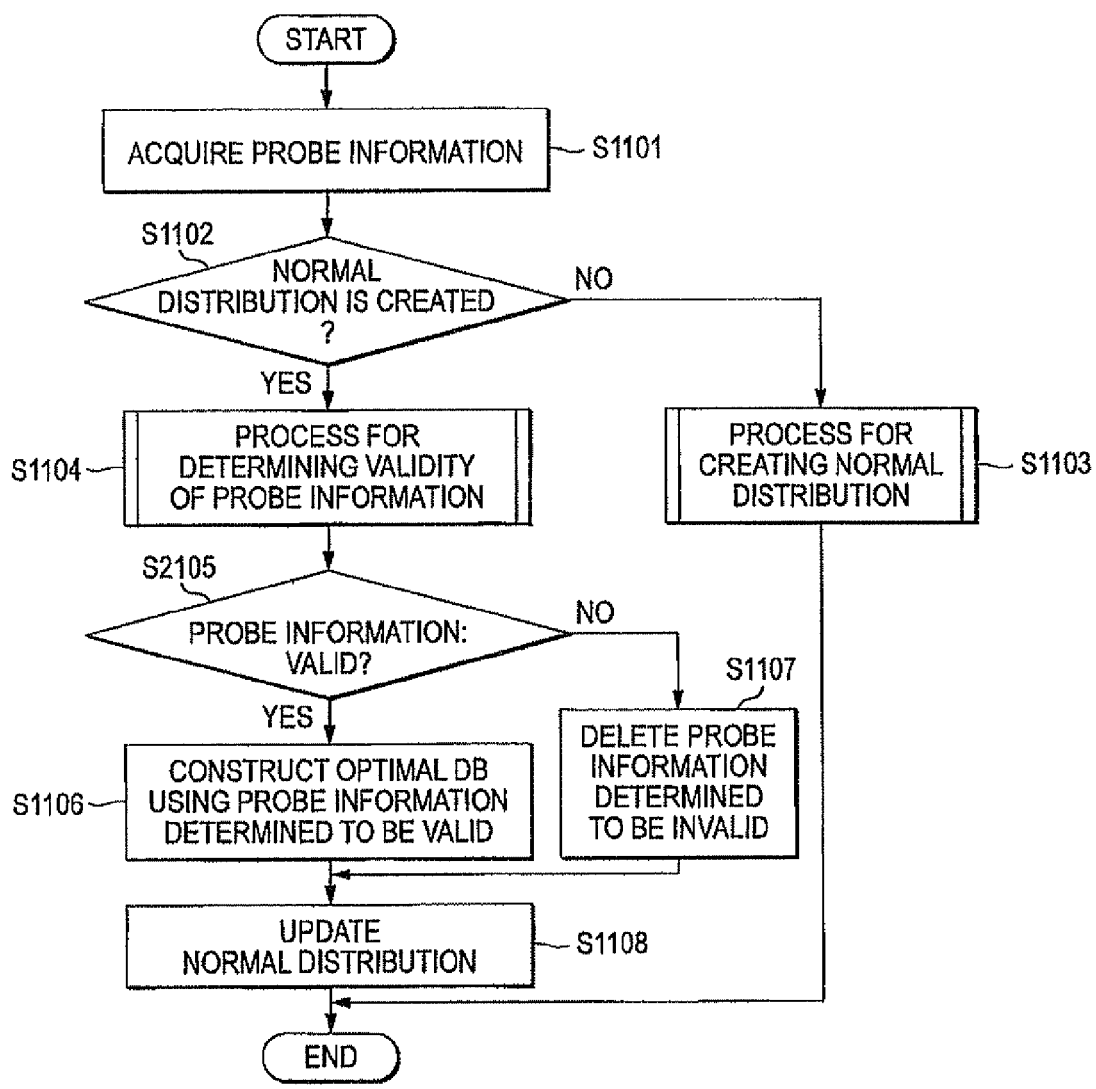
FIG. 9 is a flowchart illustrating the procedure of a process for constructing an optimal DB according to the first embodiment.
Figure 10:
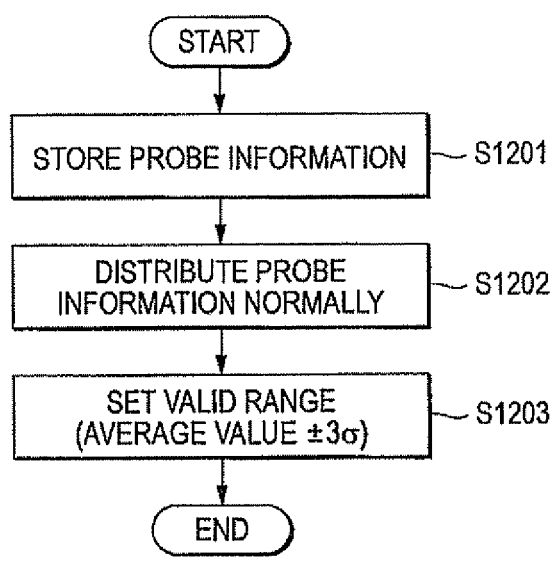
FIG. 10 is a flowchart illustrating the procedure of a process for creating a normal distribution according to the first embodiment.
Figure 11:
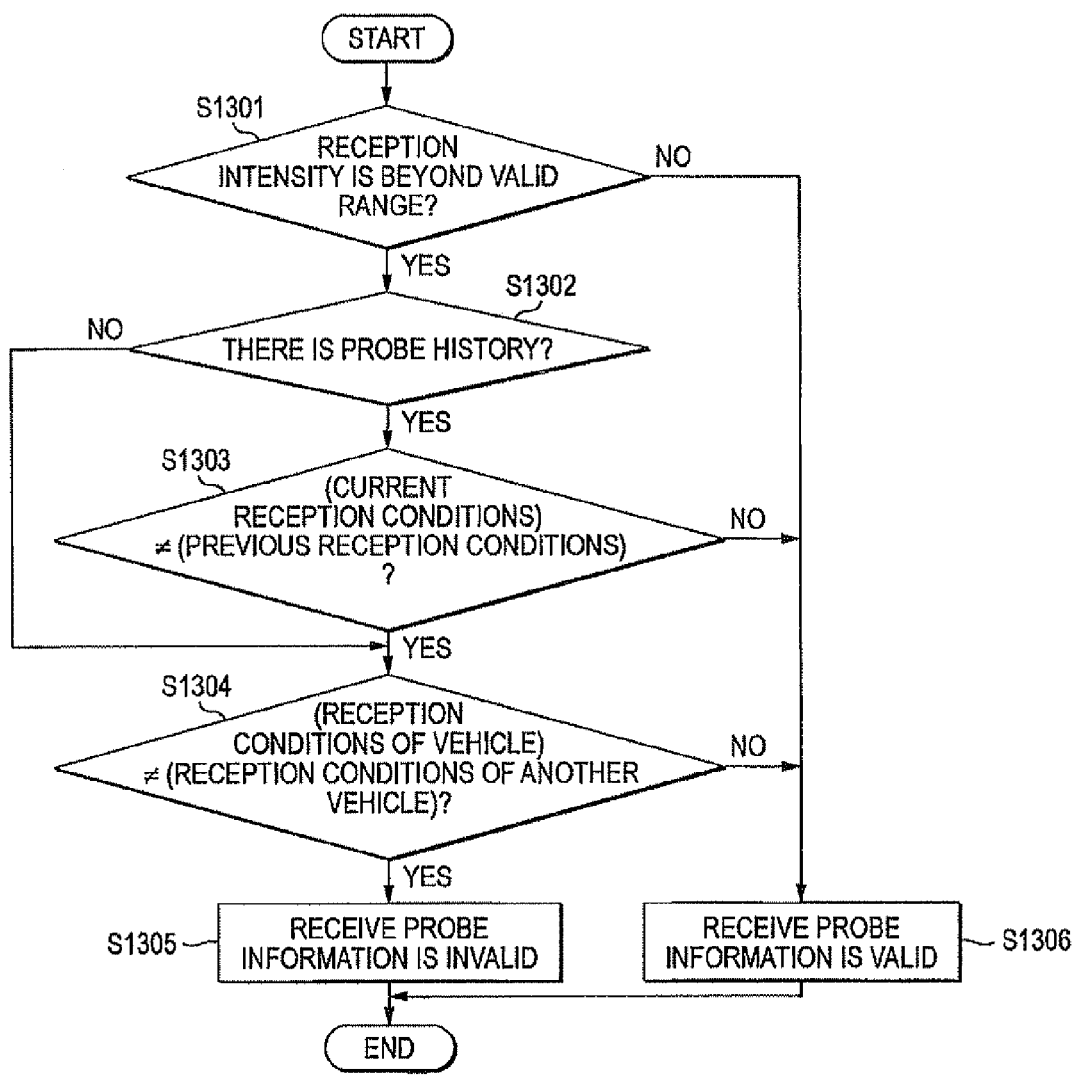
FIG. 11 is a flowchart illustrating the procedure of a process for determining the validity of probe information according to the first embodiment.

Next, the procedure performed by the control unit 1013 of the DB construction apparatus 1001 will be described with reference to FIGS. 9 to 11. FIG. 9 is a flowchart illustrating the procedure of a process of constructing an optimal DB according to the first embodiment, FIG. 10 is a flowchart illustrating the procedure of a process of creating a normal distribution according to the first embodiment, and FIG. 11 is a flowchart illustrating the procedure of a process of determining the validity of probe information according to the first embodiment. FIGS. 9 to 11 show only a process related to the construction of the optimal DB in the procedure performed by the control unit 1013.

Next, the process of constructing an optimal DB, the process of creating a normal distribution, and the process of determining the validity of probe information will be described in this order. In the following description, new probe information is simply referred to as probe information.

As shown in FIG. 9, when the DB construction apparatus 1001 is turned on, the control unit 1013 starts the process of constructing the optimal DB. When the process of constructing the optimal DB starts, the control unit 1013 acquires probe information from the probe history 1012a (Step S1101). Then, the control unit 1013 determines whether a normal distribution has been created (Step S1102).

When it is determined that the normal distribution has not been created (Step S1102, No), the control unit 1013 performs the process of creating the normal distribution shown in FIG. 10 (Step S1103) and then ends the process.

When it is determined that the normal distribution has been created (Step S1102, Yes), the control unit 1013 performs the process of determining the validity of probe information shown in FIG. 11 (Step S1104). Then, as a result of the process of determining the validity of probe information, the control unit 1013 determines whether the probe information is valid (Step S1105).

When it is determined that the probe information is invalid (Step S1105, No), the control unit 1013 deletes the probe information determined to be invalid from the probe history 1012a (Step S1107) and the process proceeds to Step S1108.

When it is determined that the probe information is valid (Step S1105, Yes), the control unit 1013 constructs the optimal DB 1012b using the probe information determined to be valid (Step S1106).

Then, the control unit 1013 performs a process of updating the normal distribution with the storage of the probe information determined to be valid or the deletion of the probe information determined to be invalid (Step S1108) and ends the process. Then, the control unit 1013 repeatedly performs Steps S1101 to S1108 during the period for which the DB construction apparatus 1001 is turned on.

Next, the process of creating a normal distribution performed by the control unit 1013 in Step S1103 will be described. As shown in FIG. 10, when the process of creating a normal distribution starts, first, the control unit 1013 stores the probe information received from each in-vehicle apparatus 1002 in the probe history 1012a (Step S1201).

Then, the control unit 1013 distributes normally the reception intensity of the probe information stored in the probe history 1012a to create a normal distribution (Step S1202). Then, the control unit 1013 calculates the average value of the reception intensity in the created normal distribution and sets the range of the calculated average value±σ as the valid range (Step S1203) and ends the process.

Next, the process of determining the validity of probe information performed by the control unit 1013 in Step S1104 will be described. As shown in FIG. 11, when the process of determining the validity of probe information starts, first, the control unit 1013 determines whether the reception intensity of the probe information is beyond the valid range set in the normal distribution (Step S1301).

When it is determined that the reception intensity is within the valid range (Step S1301, No), the control unit 1013 determines that the received probe information is valid (Step S1306) and ends the process. When it is determined that the reception intensity is beyond the valid range (Step S1301, Yes), the control unit 1013 determines whether there is a previous probe history 1012a related to the in-vehicle apparatus 1002 transmitting the probe information (Step S1302).

When the control unit 1013 determines that there is no probe history 1012a (Step S1302, No), the process proceeds to Step S1304. When it is determined that there is the probe history 1012a (Step S1302, Yes), the control unit 1013 determines whether the current and previous reception conditions of the in-vehicle apparatus 1002 transmitting the probe information for the same channel in the same area are different from each other (Step S1303).

When it is determined that the current and previous reception conditions are identical to each other (Step S1303, No), the control unit 1013 determines that the received probe information is valid (Step S1306) and ends the process.

When it is determined that the current and previous reception conditions are different from each other (Step S1303, Yes), the control unit 1013 determines whether the reception conditions of the vehicle with the in-vehicle apparatus 1002, which is the transmission source of the received probe information, are different from those of another vehicle that receives the same broadcast channel lately in the area from which the received probe information is transmitted (Step S1304).

When it is determined that the reception conditions of the vehicle are identical to those of another vehicle (Step S1304, No), the control unit 1013 determines that the received probe information is valid (Step S1306) and ends the process. When it is determined that the reception conditions of the vehicle are different from those of another vehicle (Step S1304, Yes), the control unit 1013 determines that the received probe information is invalid (Step S1305) and ends the process.

As described above, in the DB construction system 1100, the DB construction apparatus 1001 determines the validity of each probe information received from each in-vehicle apparatus 1002, deletes the probe information determined to be invalid, and constructs the optimal DB 1012b using only the probe information determined to be valid. Therefore, it is possible to improve the reliability of the optimal DB 1012b.

In the first embodiment, when reading the probe information compared with the new probe information from the probe history 1012a, the vehicle history comparing/determining unit 1013d and the all-vehicle history comparing/determining unit 1013e read the probe information related to the same broadcast channel transmitted from the same area as that from which the new probe information is transmitted. However, the vehicle history comparing/determining unit 1013d and the all-vehicle history comparing/determining unit 1013e may read the following probe information.

That is, the vehicle history comparing/determining unit 1013d and the all-vehicle history comparing/determining unit 1013e may read probe information transmitted from a sub-area including the position where new probe information is transmitted, among the sub-areas divided from the area from which the new probe information is transmitted.

As such, when the probe information transmitted from the sub-area including the position where new probe information is transmitted is read, it is possible to determine the reception conditions of the in-vehicle apparatuses 1002 provided in the vehicle and other vehicles in the range narrower than the area from which the new probe information is transmitted. Therefore, it is possible to more strictly determine the reliability of new probe information.

Second Embodiment

Figure 12:
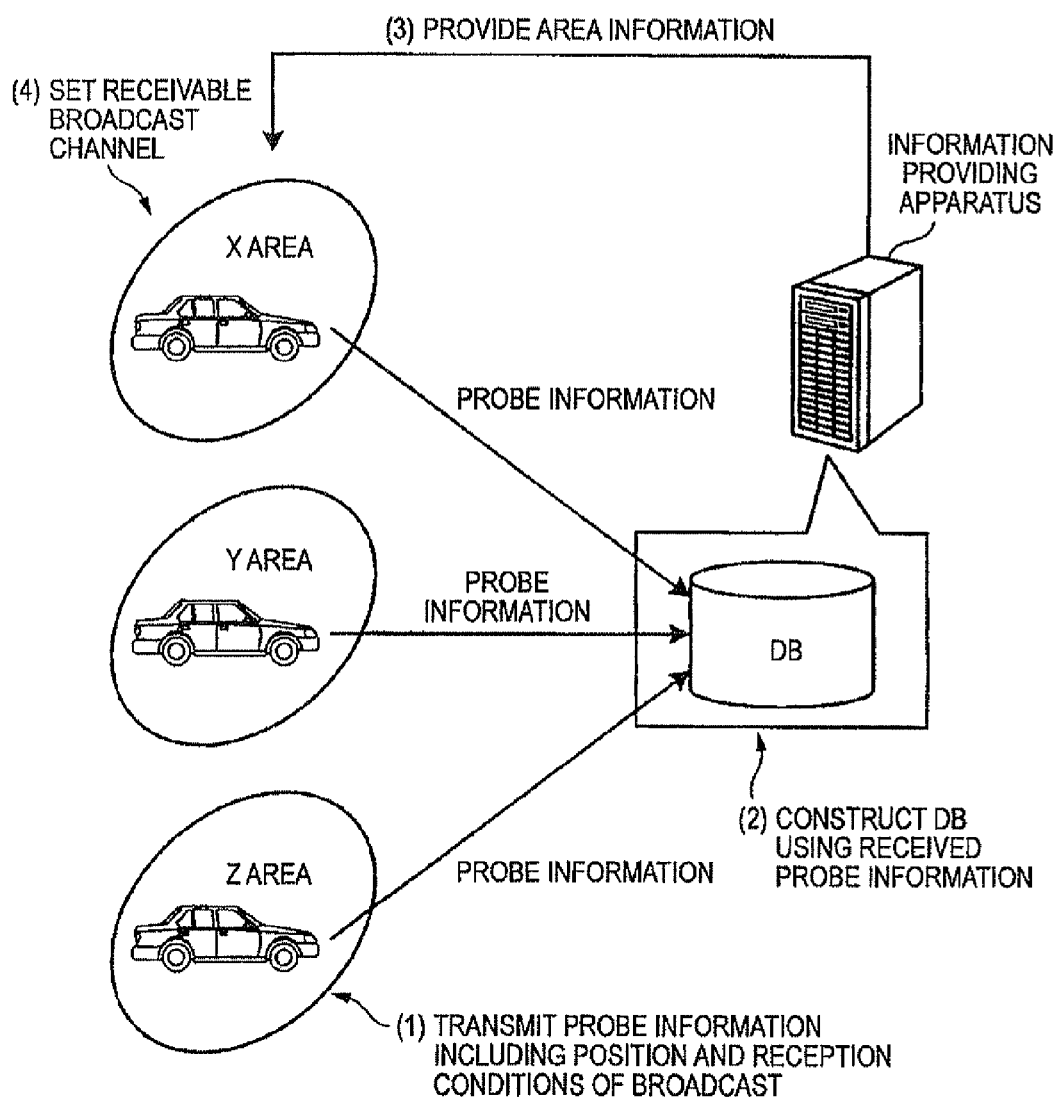
FIG. 12 is a diagram illustrating the outline of a broadcast receiving system according to the related art.
Figure 13:
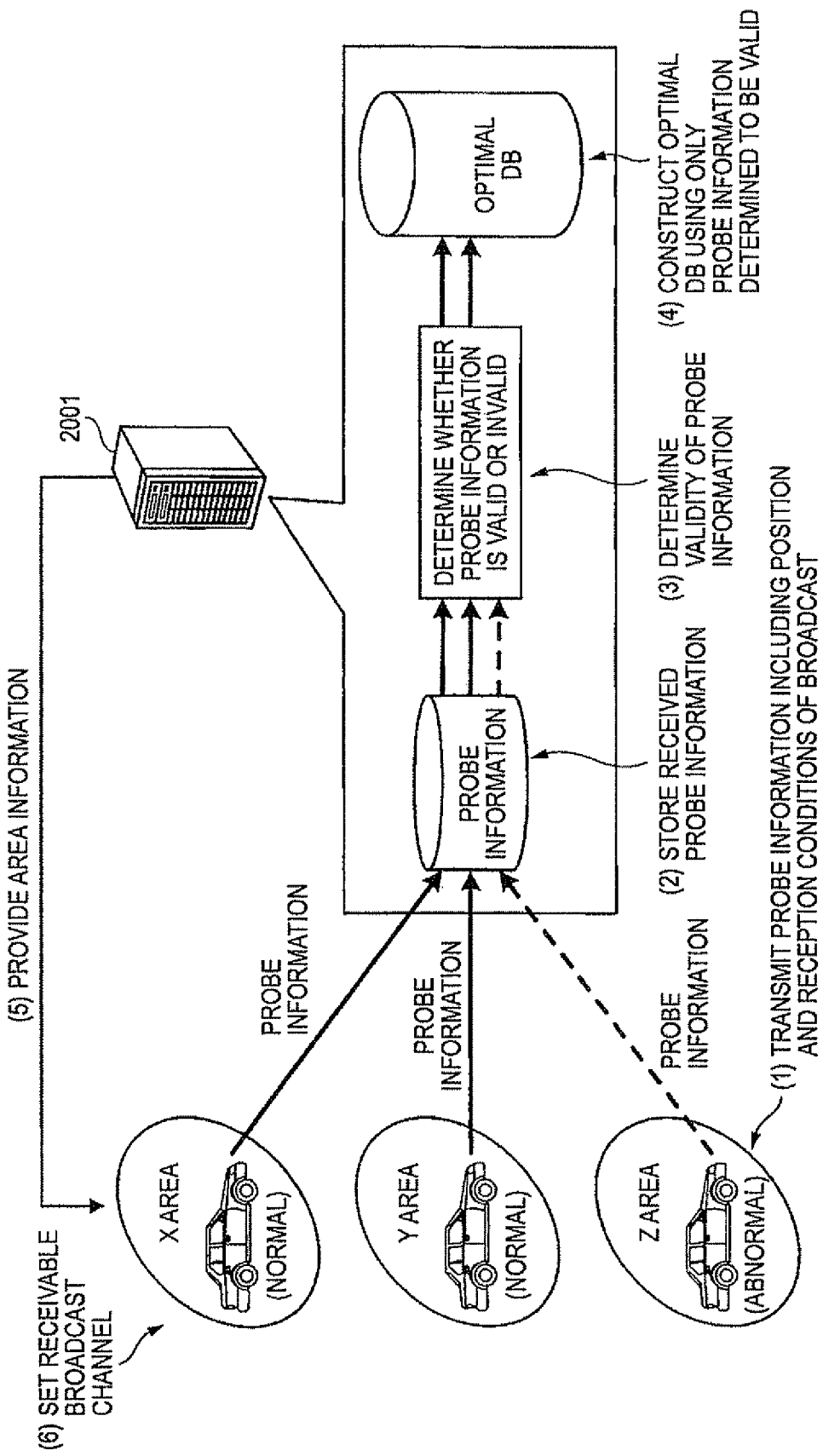
FIG. 13 is a diagram illustrating the outline of a broadcast receiving system according to the present invention.

Hereinafter, a broadcast receiving system according to a second embodiment of the present invention will be described in detail with reference to the accompanying drawings. First, the outline of a broadcast receiving system according to the present invention will be described in comparison with the broadcast receiving system according to the related art before the second embodiment of the present invention is described in detail. FIG. 12 is a diagram illustrating the outline of the broadcast receiving system according to the related art, and FIG. 13 is a diagram illustrating the outline of the broadcast receiving system according to the present invention.

Next, a broadcast receiving system in which a broadcast receiving apparatus (hereinafter, referred to as an "in-vehicle apparatus") provided in a vehicle sets a broadcast channel that can be received in the traveling area of the vehicle and receives a broadcast through the set broadcast channel will be described as an example.

The traveling area indicates each divided area divided from an area on the map, in which the vehicle provided with the in-vehicle apparatus travels. In the following description, each traveling area has a square shape having one side with a length of 1 km (so-called three-dimensional mesh), but the length of one side of each traveling area is not limited to 1 km. In addition, the shape of each traveling area is not limited to a square.

The broadcast receiving system according to the present invention is not limited to the structure in which the in-vehicle apparatus receives broadcasts, but can be applied to a structure in which any broadcast receiving apparatus, such as a home television set or a portable radio, receives broadcasts.

As shown in FIG. 12, the broadcast receiving system according to the related art includes an in-vehicle apparatus that is provided in each vehicle and receives a broadcast and an information providing apparatus that provides information (hereinafter, referred to as "area information") related to a broadcast channel that can be received in each traveling area to each in-vehicle apparatus.

In the broadcast receiving system shown in FIG. 12, each vehicle (in-vehicle apparatus) that travels in different traveling areas, such as an X area, a Y area, and a Z area, transmits probe information to the information providing apparatus provided in a predetermined aggregation center (see (1) of FIG. 12).

Each probe information transmitted to the information providing apparatus includes the position of each vehicle and the reception conditions of the broadcast channel received by each in-vehicle apparatus. The information providing apparatus constructs a database (hereinafter, referred to as a "DB") storing the broadcast channel that can be received in each traveling area, using the probe information received from each vehicle (see (2) of FIG. 12).

For example, it is assumed that the probe information received by the information providing apparatus is transmitted from the vehicle that travels in the X area and the probe information includes the reception conditions indicating that a broadcast can be received through a predetermined broadcast channel.

When the probe information is received, the information providing apparatus stores the predetermined broadcast channel as a broadcast channel that can be received in the X area in the DB. Then, the information providing apparatus constructs a DB using the probe information received from each vehicle, while updating the area information related to the broadcast channel that can be received in each traveling area.

Then, the information providing apparatus transmits the area information stored in the DB to the in-vehicle apparatus of each vehicle at a predetermined timing to provide the area information (see (3) of FIG. 12). Each in-vehicle apparatus receiving the area information sets a broadcast channel that can be received in the traveling area of the vehicle (see (4) of FIG. 12).

When the user selects a desired broadcast channel from a plurality of set broadcast channels, the in-vehicle apparatus tunes the selected broadcast channel and receives broadcasts.

However, since there is a problem in the reliability of the area information received from the information providing apparatus, there is a concern that the broadcast receiving apparatus shown in FIG. 12 may not set an appropriate broadcast channel in each traveling area of the vehicle.

That is, since the area information is updated by the information providing apparatus according to the related art, without considering, for example, a variation in the receiving environment in each traveling area over time or the state of each in-vehicle apparatus, the reliability of the area information is reduced.

Therefore, there is a concern that the in-vehicle apparatus will set the broadcast channel that cannot be received in the traveling area of the vehicle as a receivable broadcast channel or will not set a receivable broadcast channel.

For example, when a new multistory building that has not existed before is constructed in the X area, a local area in which a predetermined broadcast channel cannot be received is likely to be formed in the vicinity of the multistory building. The in-vehicle apparatus of the vehicle that travels in the area in which a predetermined broadcast channel cannot be received transmits probe information indicating that a predetermined broadcast channel cannot be received in the X area to the information providing apparatus.

Therefore, there is a concern that the information providing apparatus will store erroneous area information indicating that the predetermined broadcast channel cannot be received in the X area in the DB even when it can actually receive the predetermined broadcast channel in most of the X area.

For example, in the case of the in-vehicle apparatus whose broadcast receiving function does not work, even though the in-vehicle apparatus is in the X area in which a predetermined broadcast channel can be actually received, it transmits probe information indicating that a predetermined broadcast channel cannot be received in the X area to the information providing apparatus.

Therefore, there is a concern that, when receiving the probe information from the in-vehicle apparatus whose receiving function does not work, the information providing apparatus will store, in the DB, erroneous area information indicating that a predetermined broadcast channel cannot be received in the X area even though the predetermined broadcast channel can be actually received in the X area.

As such, when the area information is wrong, there is a concern that the in-vehicle apparatus will set the broadcast channel that cannot be received in the traveling area of the vehicle as a receivable broadcast channel or will not set a receivable broadcast channel.

In the broadcast receiving system according to the present invention, the information providing apparatus extracts area information from the optimal DB with high reliability that is constructed using only the probe information which has been received from each in-vehicle apparatus and determined to be valid, and transmits the area information to each in-vehicle apparatus.

Then, each in-vehicle apparatus receives the area information with high reliability from the information providing apparatus and sets a broadcast channel that can be received in the traveling area of the vehicle on the basis of the received area information.

Therefore, according to the present invention, each in-vehicle apparatus can set a broadcast channel on the basis of high-reliability area information. As a result, the in-vehicle apparatus can set an appropriate broadcast channel in each traveling area.

Specifically, as shown in FIG. 13, the broadcast receiving system according to the present invention includes an in-vehicle apparatus that is provided in each vehicle and receives broadcasts and an information providing apparatus 2001 that extracts area information related to the broadcast channel that can be received in each traveling area from an optimal DB and provides the area information to each in-vehicle apparatus.

In the broadcast receiving system shown in FIG. 13, each in-vehicle apparatus transmits probe information to an information providing apparatus 2001 (see (1) of FIG. 13). Here, a case in which the broadcast receiving functions of the in-vehicle apparatuses in the X area and the Y area are normal and the broadcast receiving function of the in-vehicle apparatus in the Z area is abnormal (does not work) will be described as an example.

When receiving probe information from each in-vehicle apparatus, the information providing apparatus 2001 shown in FIG. 13 stores the received probe information once (see (2) of FIG. 13). Then, when receiving new probe information (hereinafter, referred to as "new probe information"), the information providing apparatus 2001 determines the validity of the new probe information on the basis of the stored probe information (see (3) of FIG. 13).

In this case, the information providing apparatus 2001 determines the validity of the new probe information on the basis of reception intensity included in the new probe information and reception intensity included in another probe information that has been transmitted from the same area as that from which the new probe information is transmitted. Here, another probe information relates to the same broadcast channel as the new probe information.

In the example shown in FIG. 13, the information providing apparatus 2001 determines the new probe information received from the X area and the Y area to be valid and determines the new probe information received from the Z area to be invalid. Then, the information providing apparatus 2001 updates the area information and constructs the optimal DB using only the probe information determined to be valid, that is, the new probe information transmitted from the X area and the Y area, among the new probe information (see (4) of FIG. 13).

Therefore, the content of wrong probe information received from the in-vehicle apparatus whose receiving function is abnormal is not reflected to the area information stored in the optimal DB that is constructed by the information providing apparatus 2001. As a result, according to the present invention, it is possible to improve the reliability of the optimal DB constructed by the information providing apparatus 2001.

Then, the information providing apparatus 2001 transmits the area information extracted from the optimal DB to each in-vehicle apparatus at a predetermined timing, thereby providing the area information (see (5) of FIG. 13). Then, each in-vehicle apparatus sets a broadcast channel that can be received in each traveling area on the basis of the area information received from the information providing apparatus 2001 (see (6) of FIG. 13).

As such, in the broadcast receiving system shown in FIG. 13, each in-vehicle apparatus can set a broadcast channel on the basis of the area information extracted from the high-reliability optimal DB. Therefore, each in-vehicle apparatus can set an appropriate broadcast channel in each traveling area.

In the broadcast receiving system according to the present invention, the information providing apparatus 2001 determines again the validity of the probe information that has been determined to be invalid using all of the stored probe information. When the probe information that has been determined to be invalid is determined to be valid, it is used to update the area information. The redetermination will be described in detail below with reference to FIGS. 18A to 18C.

Next, a broadcast receiving system according to a second embodiment of the present invention will be described in detail. In the second embodiment, a case in which the broadcast receiving apparatus is an in-vehicle apparatus will be described as an example. The broadcast receiving apparatus according to the present invention is not limited to the in-vehicle apparatus, but may be any broadcast receiving apparatus.

Figure 14:
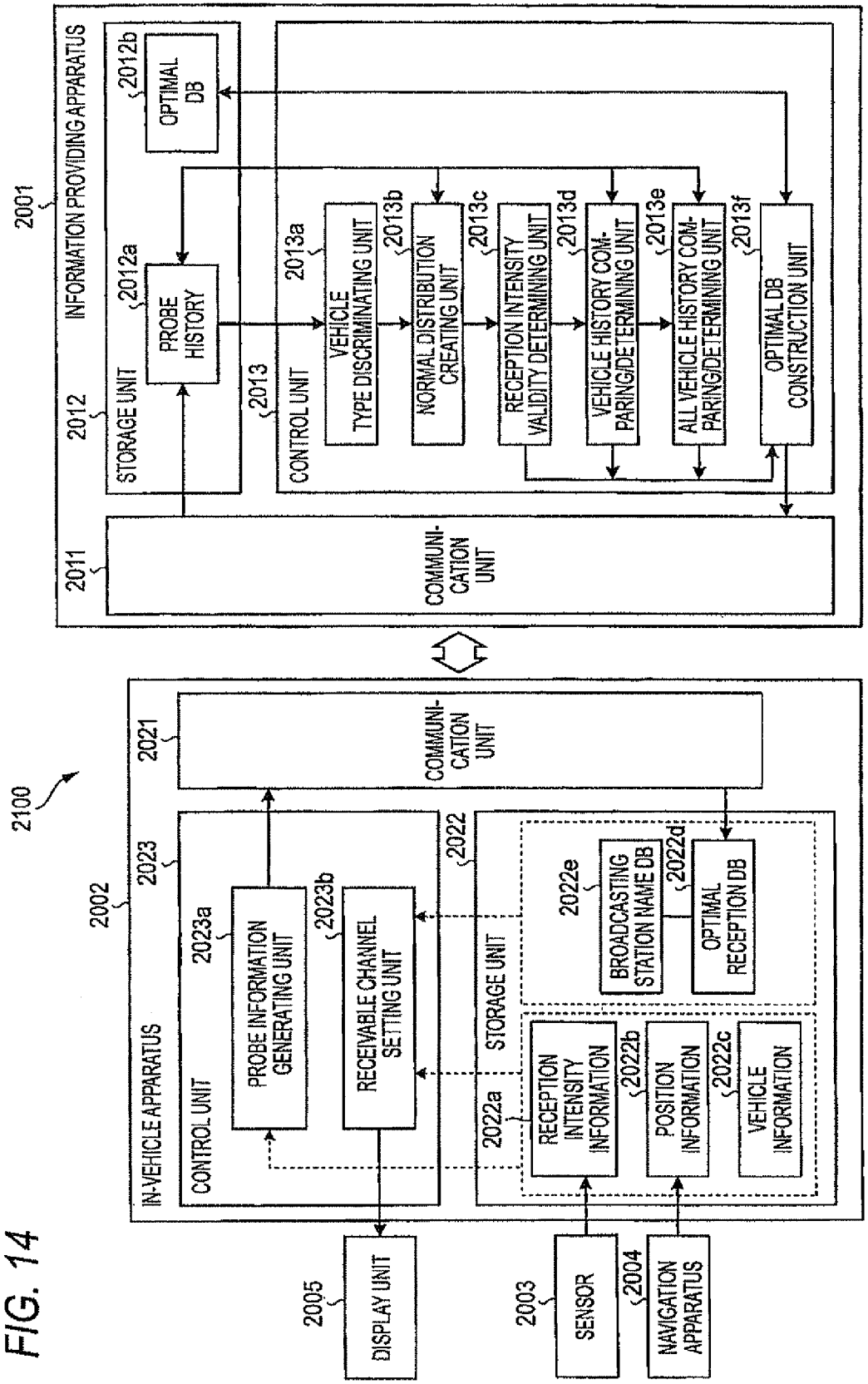
FIG. 14 is a block diagram illustrating the structure of a broadcast receiving system according to a second embodiment of the present invention.

FIG. 14 is a block diagram illustrating the structure of a broadcast receiving system 2100 according to the second embodiment. As shown in FIG. 14, the broadcast receiving system 2100 includes an information providing apparatus 2001 and an in-vehicle apparatus 2002. FIG. 14 shows only components required to describe the characteristics of the broadcast receiving system 2100, but does not show general components.

As shown in FIG. 14, the information providing apparatus 2001 includes a communication unit 2011, a storage unit 2012, and a control unit 2013. The communication unit 2011 is a communication interface that transmits/receives various kinds of information to/from the in-vehicle apparatus 2002. The storage unit 2012 is a non-volatile information storage device that stores a probe history 2012*a* and an optimal DB 2012*b*.

Next, the probe history 2012*a* and the optimal DB 2012*b* stored in the storage unit 2012 will be described with reference to FIGS. 15 and 16. FIG. 15 is a diagram illustrating an example of the probe history 2012*a* according to the second embodiment and FIG. 16 is a diagram illustrating an example of the optimal DB 2012*b* according to the second embodiment.

First, the probe history 2012*a* will be described with reference to FIG. 15 and then the optimal DB 2012*b* will be described with reference to FIG. 16. The probe history 2012*a* according to the second embodiment is obtained by storing the probe information received by the information providing apparatus 2001 from each in-vehicle apparatus 2002 and the reception history of the probe information.

Specifically, as shown in FIG. 15, information capable of identifying the vehicle provided with the in-vehicle apparatus 2002, information capable of identifying the type of vehicle, the date and time when the probe information is received, the kind, frequency, and reception intensity of broadcasts received by the in-vehicle apparatus 2002, and the position of the in-vehicle apparatus 2002 are stored in the probe history 2012*a* so as to be associated with each other.

For example, information indicating that the probe information is received from a vehicle N1 of type α at 12 o'clock on Jan. 1, 2009 and information indicating that the in-vehicle apparatus 2002 transmitting the probe information receives an AM broadcast with a frequency A at a reception intensity of XXX at latitude . . . N and longitude . . . E at the same date and time are stored in the probe history 2012a.

FIG. 15 shows the probe history 2012a related to radio broadcasts. Therefore, the probe history 2012a shown in FIG. 15 stores a frequency as the broadcast channel. A probe history related to video broadcasts stores a channel corresponding to each broadcasting station as the broadcast channel.

Next, the optimal DB 2012b stored in the storage unit 2012 will be described with reference to FIG. 16. The optimal DB 2012b is constructed by the control unit 2013 and stores broadcast channels that can be received in each traveling area. In particular, the optimal DB 2012b is constructed using only the probe information that is determined to be valid, among a plurality of probe information received by the information providing apparatus 2001 from each in-vehicle apparatus 2002.

Specifically, as shown in FIG. 16, in the optimal DB 2012b, a mesh ID for identifying each traveling area, the type of vehicle that can receive a broadcast in each traveling area, the kind of broadcast that can be received, a frequency, and the average reception intensity of a broadcast corresponding to each frequency in each traveling area are stored so as to be associated with each other.

For example, as shown in FIG. 16, the optimal DB 2012b stores, for example, information indicating that the in-vehicle apparatus provided in the vehicle of type a can receive an AM broadcast of a broadcast channel corresponding to a frequency A at a reception intensity of XXX in the traveling area corresponding to the mesh ID xxx.

The information providing apparatus 2001 transmits the area information stored in the optimal DB 2012b shown in FIG. 16 to each in-vehicle apparatus 2002 at a predetermined timing. The information providing apparatus 2001 can transmit the area information to the in-vehicle apparatus 2002 at any time, such as, after a predetermined period of time has elapsed from the previous transmission of the area information or when the number of times the area information is updated reaches a predetermined value. When receiving a request from the in-vehicle apparatus 2002, the information providing apparatus 2001 may transmit the area information in response to the request.

Returning to FIG. 16, the control unit 2013 of the information providing apparatus 2001 includes a vehicle type discriminating unit 2013a, a normal distribution creating unit 2013b, a reception intensity validity determining unit 2013c, a vehicle history comparing/determining unit 2013d, an all-vehicle history comparing/determining unit 2013e, and an optimal DB construction unit 2013f.

The vehicle type discriminating unit 2013a is a processing unit that reads new probe information from the probe history 2012a, reads information related to the vehicle from the new probe information, and discriminates the type of vehicle, which is the transmission source of the new probe information, on the basis of the read information. The vehicle type discriminating unit 2013a outputs the discrimination result of the type of vehicle and the new probe information to the normal distribution creating unit 2013b.

The normal distribution creating unit 2013b is a processing unit that creates a normal distribution used by the reception intensity validity determining unit 2013c to determine the validity of the reception intensity included in the new probe information. The normal distribution creating unit 2013b reads, from the probe history 2012a, a group of probe information with the same broadcast channel as that of the new probe information among the probe information transmitted from the same transmission area as that from which the new probe information is transmitted.

Then, the normal distribution creating unit 2013b creates a normal distribution for the reception intensity of a broadcast in the traveling area from which the new probe information is transmitted, using the group of probe information read from the probe history 2012a.

Then, the normal distribution creating unit 2013b sets a valid range, which is a standard used by the reception intensity validity determining unit 2013c to determine the validity of the reception intensity included in the new probe information, in the created normal distribution. The normal distribution creating unit 2013b outputs the normal distribution having the valid range set therein and the new probe information to the reception intensity validity determining unit 2013c. A procedure of creating the normal distribution and a procedure of setting the valid range in the normal distribution creating unit 2013b will be described in detail below with reference to FIGS. 17A to 17D.

The reception intensity validity determining unit 2013c compares the normal distribution for the reception intensity created by the normal distribution creating unit 2013b with the reception intensity included in the new probe information to determine the validity of the reception intensity in the new probe information.

When it is determined that the reception intensity is valid, the reception intensity validity determining unit 2013c outputs the new probe information to the optimal DB construction unit 2013f. When it is determined that the reception intensity is invalid, the reception intensity validity determining unit 2013c outputs the new probe information to the vehicle history comparing/determining unit 2013d.

Next, the procedure of creating the normal distribution and setting the valid range in the normal distribution creating unit 2013b and the procedure of determining the validity of the reception intensity in the new probe information in the reception intensity validity determining unit 2013c will be described with reference to FIGS. 17A to 17D. FIGS. 17A to 17D are diagrams illustrating an example of the procedure of creating the normal distribution and setting the valid range and the procedure of determining the validity of the reception intensity according to the second embodiment.

When creating the normal distribution, first, the normal distribution creating unit 2013b searches for probe information that is transmitted from the same traveling area as that from which the new probe information is transmitted in the probe history 2012a, and reads the searched probe information group. The normal distribution creating unit 2013b reads probe information related to the same broadcast channel as that of the new probe information.

Then, as shown in FIG. 17A, the normal distribution creating unit 2013b creates a distribution function for the reception intensity included in each probe information read from the probe history 2012a as the normal distribution. FIG. 17A shows a normal distribution when a broadcast channel corresponding to the new probe information can be received in the traveling area from which the new probe information is transmitted.

As shown in FIG. 17A, since the normal distribution is created on the basis of the probe information transmitted from the traveling area in which a broadcast channel corresponding to the new probe information can be received, the distribution of the reception intensity is concentrated on about 60 dB where a broadcast channel can be received relatively well.

That is, when the receiving function of the in-vehicle apparatus 2002 transmitting the new probe information is normal, the reception intensity of the new probe information is approximately 60 dB. Therefore, the normal distribution creating unit 2013b sets the range of the average value (here, 60 dB)±σ of the reception intensity in the normal distribution as the valid range. For example, the normal distribution creating unit 2013b sets a range of 40 dB to 80 dB as the valid range.

When the normal distribution creating unit 2013b creates the normal distribution and sets the valid range in this way, the reception intensity validity determining unit 2013c determines whether the reception intensity of the new probe information is within the valid range, thereby determining the validity of the reception intensity included in the new probe information.

Specifically, as shown in FIG. 17B, for example, when the reception intensity of the new probe information received from the in-vehicle apparatus 2002 of a vehicle N1 is 50 dB, the reception intensity validity determining unit 2013c determines that the receiving function of the in-vehicle apparatus 2002 provided in the vehicle N1 is normal since the reception intensity is within the valid range and determines that the reception intensity of the new probe information is valid.

Similarly, the reception intensity validity determining unit 2013c determines that the receiving function of the in-vehicle apparatus 2002 provided in a vehicle N2 is normal and determines that the reception intensity of the new probe information is valid.

Meanwhile, when the reception intensity of the new probe information received from the in-vehicle apparatus 2002 of a vehicle N3 is 25 dB, the reception intensity validity determining unit 2013c determines that the receiving function of the in-vehicle apparatus 2002 provided in the vehicle N3 is abnormal since the reception intensity is beyond the valid range and determines that the reception intensity of the new probe information is invalid.

Then, the reception intensity validity determining unit 2013c outputs the new probe information having the reception intensity determined to be valid to the optimal DB construction unit 2013f, and outputs the new probe information having the reception intensity determined to be invalid to the vehicle history comparing/determining unit 2013d.

When a broadcast channel corresponding to the new probe information cannot be received in the traveling area from which the new probe information has been transmitted, the normal distribution creating unit 2013b creates a distribution function shown in FIG. 17C as the normal distribution.

As shown in FIG. 17C, since the normal distribution is created on the basis of the probe information transmitted from the traveling area in which a broadcast channel corresponding to the new probe information cannot be received, the distribution of the reception intensity is concentrated on about 30 dB where a broadcast cannot be normally received.

That is, when the receiving function of the in-vehicle apparatus 2002 transmitting the new probe information is normal, the reception intensity of the new probe information is approximately 30 dB. Therefore, the normal distribution creating unit 2013b sets the range of the average value (here, 30 dB)±σ of the reception intensity in the normal distribution as the valid range. For example, the normal distribution creating unit 2013b sets a range of 0 dB to 40 dB as the valid range.

When the normal distribution creating unit 2013b creates the normal distribution and sets the valid range in this way, the reception intensity validity determining unit 2013c determines whether the reception intensity of the new probe information is within the valid range, thereby determining the validity of the reception intensity included in the new probe information.

That is, as shown in FIG. 17D, the reception intensity validity determining unit 2013c determines that the receiving function of the in-vehicle apparatuses 2002 provided in the vehicles N1 and N2 is normal and determines that the reception intensity of the new probe information is valid. In addition, the reception intensity validity determining unit 2013c determines that the reception intensity detecting function of the in-vehicle apparatus 2002 provided in the vehicle N3 is abnormal and determines that the reception intensity of the new probe information is invalid.

Then, the reception intensity validity determining unit 2013c outputs the new probe information having the reception intensity determined to be valid to the optimal DB construction unit 2013f, and outputs the new probe information having the reception intensity determined to be invalid to the vehicle history comparing/determining unit 2013d.

The probe information read from the probe history 2012a by the normal distribution creating unit 2013b to create the normal distribution may be probe information that is transmitted from a sub-area including the transmission position of the new probe information among the sub-areas divided from the traveling area from which the new probe information is transmitted.

As such, when the probe information which is transmitted from the sub-area including the transmission position of the new probe information is read, the normal distribution creating unit 2013b can create a normal distribution, assuming a receiving environment narrower than the traveling area from which the new probe information is transmitted.

Returning to FIG. 14, the vehicle history comparing/determining unit 2013d is a processing unit that compares the current and previous reception conditions of the in-vehicle apparatus 2002 transmitting the new probe information in the same area to estimate the failure of the in-vehicle apparatus 2002 transmitting the new probe information or a variation in the receiving environment over time.

When it is estimated that there is a failure in the vehicle apparatus 2002 transmitting the new probe information or the receiving environment varies over time, the vehicle history comparing/determining unit 2013d outputs the new probe information to the all-vehicle history comparing/determining unit 2013e.

On the other hand, when it is estimated that there is no failure in the vehicle apparatus 2002 transmitting the new probe information and the receiving environment does not vary over time, the vehicle history comparing/determining unit 2013d outputs the new probe information to the optimal DB construction unit 2013f. The determination procedure of the vehicle history comparing/determining unit 2013d will be described in detail below with reference to FIGS. 18A to 18C.

The all-vehicle history comparing/determining unit 2013e is a processing unit that compares the reception conditions of broadcasts by the in-vehicle apparatus 2002 transmitting the new probe information with the reception conditions of broadcasts by all in-vehicle apparatuses 2002 that transmit probe information related to the same broadcast channel from the same traveling area as that from which the new probe information is transmitted, thereby determining whether there is a failure in the in-vehicle apparatus 2002 transmitting the new probe information.

When it is determined that there is a failure in the in-vehicle apparatus 2002 transmitting the new probe information, the all-vehicle history comparing/determining unit 2013e deletes the new probe information from the probe history 2012a. On the other hand, when it is determined that there is no failure in the in-vehicle apparatus 2002 transmitting the new probe information, the all-vehicle history comparing/determining unit 2013e outputs the new probe information to the optimal DB construction unit 2013f.

Figure 18A:
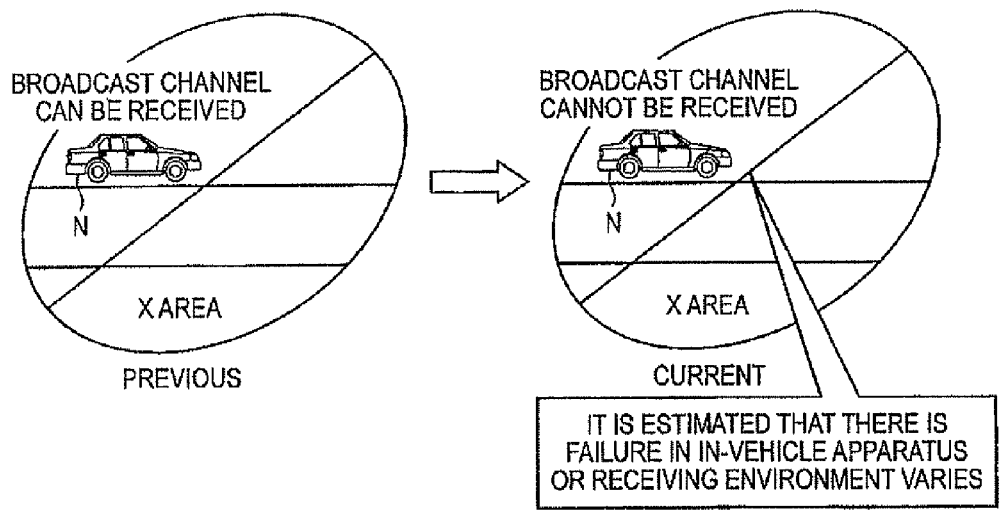
FIGS. 18A to 18C are diagrams illustrating determination procedures performed by a vehicle history comparing/determining unit and an all-vehicle history comparing/determining unit according to the second embodiment.
Figure 18B:
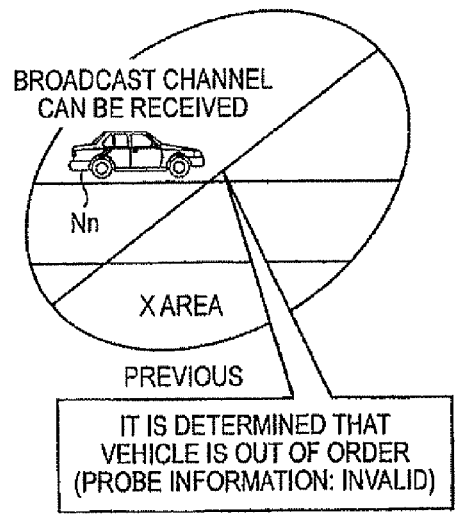
Figure 18C:
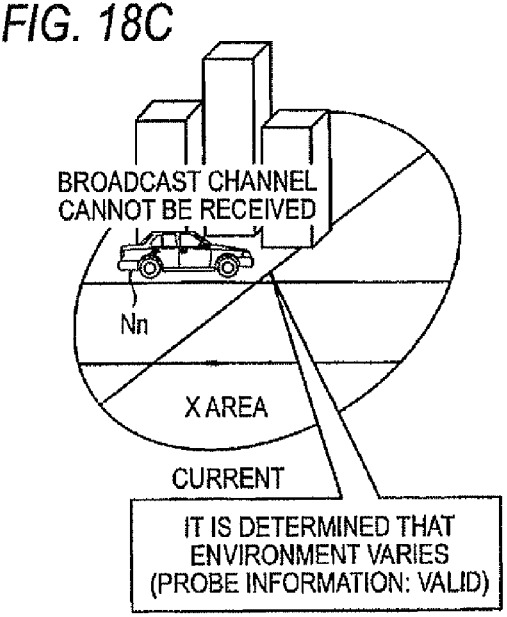

Next, the determination procedures of the vehicle history comparing/determining unit 2013d and the all-vehicle history comparing/determining unit 2013e will be described with reference to FIGS. 18A to 18C. FIGS. 18A to 18C are diagrams illustrating the determination procedures of the vehicle history comparing/determining unit 2013d and the all-vehicle history comparing/determining unit 2013e according to the second embodiment. In FIGS. 18A to 18C, the vehicle provided with the in-vehicle apparatus 2002 transmitting the new probe information is referred to as a vehicle N and vehicles other than the vehicle N are referred to as other vehicles Nn.

When the new probe information having the reception intensity determined to be invalid is input from the reception intensity validity determining unit 2013c, the vehicle history comparing/determining unit 2013d reads probe information related to the same broadcast channel previously transmitted from the same traveling area by the in-vehicle apparatus 2002 of the vehicle N from the probe history 2012a.

When the reception intensity of the probe information read from the probe history 2012a is equal to or greater than a predetermined receivable threshold value, the vehicle history comparing/determining unit 2013d determines that a broadcast channel could be received in the past. On the other hand, when the reception intensity of the probe information read from the probe history 2012a is less than the predetermined receivable threshold value, the vehicle history comparing/determining unit 2013d determines that a broadcast channel could not be received in the past.

When the current and previous reception conditions of the in-vehicle apparatus 2002 of the vehicle N are different from each other, the vehicle history comparing/determining unit 2013d estimates that there is a failure in the in-vehicle apparatus 2002 of the vehicle N or the receiving environment varies in the traveling area from which the new probe information is transmitted.

For example, as shown in FIG. 18A, it is assumed that the vehicle history comparing/determining unit 2013d determines that the in-vehicle apparatus 2002 of the vehicle N could receive a broadcast channel corresponding to the new probe information in the X area in the past.

Meanwhile, as shown in FIG. 18A, it is assumed that the vehicle history comparing/determining unit 2013d determines that the in-vehicle apparatus 2002 of the vehicle N cannot currently receive a broadcast channel corresponding to the new probe information in the X area.

As such, when the broadcast of the broadcast channel that could be received in the X area in the past cannot be currently received, the in-vehicle apparatus 2002 of the vehicle N is likely to be out of order or the receiving environment is likely to vary in the X area.

The reason for this is that, for example, when a multistory building that has not existed in the X area is newly constructed in the X area or when the in-vehicle apparatus 2002 of the vehicle N that has not been out of order is currently out of order, the current and previous reception conditions are different from each other.

In addition, when a broadcast of the broadcast channel that could not be received in the X area in the past can be currently received, the in-vehicle apparatus 2002 of the vehicle N is likely to be out of order or the receiving environment is likely to vary in the X area.

The reason for this is that, for example, when the multistory building that has existed in the X area is demolished in the X area, the current and previous reception conditions are different from each other. In addition, when the normal in-vehicle apparatus 2002 that transmitted valid probe information indicating that a broadcast channel could be received erroneously transmits probe information indicating that a broadcast channel can be received in the same traveling area due to a failure, the current and previous reception conditions are different from each other.

Therefore, when the current and previous reception conditions of the vehicle N are different from each other, the vehicle history comparing/determining unit 2013d determines that the new probe information is not valid and outputs the new probe information to the all-vehicle history comparing/determining unit 2013e.

On the other hand, when the current and previous reception conditions of the vehicle N are identical to each other, the vehicle history comparing/determining unit 2013d determines that the new probe information is valid and outputs the new probe information to the optimal DB construction unit 2013f.

Next, the operation of the all-vehicle history comparing/determining unit 2013e will be described with reference to FIGS. 18B and 18C. When the new probe information is input from the vehicle history comparing/determining unit 2013d, the all-vehicle history comparing/determining unit 2013e reads the probe information that is currently (lately) transmitted from the in-vehicle apparatus 2002 of anther vehicle Nn in the X area from the probe history 2012a. The probe information read from the probe history 2012a relates to the same broadcast channel as that of the new probe information.

The term "current (latest)" means a period (for example, within one week) before a predetermined period has elapsed from the date and time when the new probe information has been transmitted. In the second embodiment, a case in which the all-vehicle history comparing/determining unit 2013e reads the probe information that is currently (lately) transmitted from the in-vehicle apparatus 2002 of anther vehicle Nn is given as an example. However, the all-vehicle history comparing/determining unit 2013e may read the probe information that is transmitted lately from the in-vehicle apparatus 2002 of the vehicle N.

Then, the all-vehicle history comparing/determining unit 2013e compares the reception intensity of the new probe information with a predetermined receivable threshold value to determine the current reception conditions of the in-vehicle apparatus 2002 of the vehicle N. In addition, the all-vehicle history comparing/determining unit 2013e compares the reception intensity of the probe information read from the probe history 2012a with the predetermined receivable threshold value to determine the current reception conditions of the in-vehicle apparatus 2002 of another vehicle Nn.

As a result, when the current reception conditions of the in-vehicle apparatus 2002 of the vehicle N in the X area are not identical to the current reception conditions of the in-vehicle apparatus 2002 of another vehicle Nn in the X area, the all-vehicle history comparing/determining unit 2013e determines that there is a failure in the in-vehicle apparatus 2002 of the vehicle N.

On the other hand, when the current reception conditions of the in-vehicle apparatus 2002 of the vehicle N in the X area are identical to the current reception conditions of the in-vehicle apparatus 2002 of another vehicle Nn in the X area, the all-vehicle history comparing/determining unit 2013e determines that the receiving environment in the X area has been changed.

For example, when the vehicle N cannot receive a broadcast in the X area and another vehicle Nn can currently receive the same broadcast channel as the vehicle N in the X area as shown in FIG. 18B, the all-vehicle history comparing/determining unit 2013e determines that there is a failure in the in-vehicle apparatus 2002 of the vehicle N.

On the other hand, when the vehicle N cannot receive a broadcast in the X area and another vehicle Nn cannot currently receive the same broadcast channel as the vehicle N in the X area as shown in FIG. 18C, the all-vehicle history comparing/determining unit 2013e determines that the receiving environment in the X area has been changed due to, for example, the construction of a multistory building.

When it is determined that there is a failure in the in-vehicle apparatus 2002 of the vehicle N, the all-vehicle history comparing/determining unit 2013e determines that the new probe information is invalid and deletes the new probe information from the probe history 2012a. When it is determined that the receiving environment in the X area is changed, the all-vehicle history comparing/determining unit 2013e determines that the new probe information is valid and outputs the new probe information to the optimal DB construction unit 2013f.

As such, the all-vehicle history comparing/determining unit 2013e deletes the invalid new probe information transmitted from the in-vehicle apparatus 2002 that is clearly out of order from the probe history 2012a. Therefore, it is possible to improve the reliability of the normal distribution to be created by the normal distribution creating unit 2013b.

Returning to FIG. 14, the optimal DB construction unit 2013f is a processing unit that constructs the optimal DB 2012b shown in FIG. 16 while updating the optimal DB 2012b, using only the new probe information that has been input from the reception intensity validity determining unit 2013c, the vehicle history comparing/determining unit 2013d, and the all vehicle history comparing/determining unit 2013e and then determined to be valid.

Figure 19:
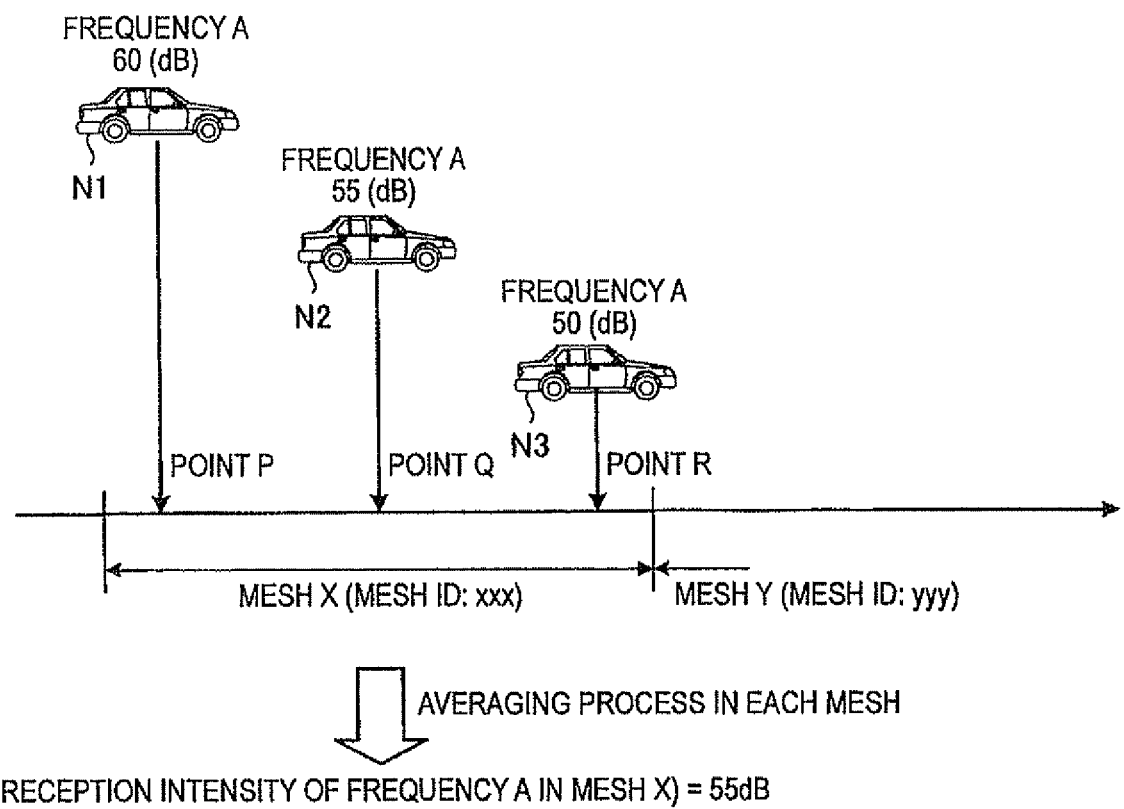
FIG. 19 is a diagram illustrating an example of a procedure of constructing an optimal DB according to the second embodiment.

Next, a procedure of constructing the optimal DB 2012b in the optimal DB construction unit 2013f will be described with reference to FIG. 19. FIG. 19 is a diagram illustrating an example of the procedure of constructing the optimal DB 2012b according to the second embodiment. The optimal DB construction unit 2013f averages the reception intensities of a plurality of input new probe information for each broadcast channel in each traveling area to determine the reception intensity of each broadcast channel in each traveling area.

For example, as shown in FIG. 19, a case in which the new probe information transmitted from the in-vehicle apparatuses 2002 of three vehicles N1, N2, and N3 in a traveling area corresponding to a mesh X identified by the mesh ID xxx is input to the optimal DB construction unit 2013f will be described.

As shown in FIG. 19, it is assumed that new probe information indicating that a broadcast channel with a frequency A is received at a reception intensity of 60 dB is transmitted from the in-vehicle apparatus 2002 of the vehicle N1 at a point P. In addition, it is assumed that new probe information indicating that a broadcast channel with the frequency A is received at a reception intensity of 55 dB is transmitted from the in-vehicle apparatus 2002 of the vehicle N2 at a point Q. It is assumed that new probe information indicating that a broadcast channel with the frequency A is received at a reception intensity of 50 dB is transmitted from the in-vehicle apparatus 2002 of the vehicle N3 at a point R.

When the new probe information transmitted from the in-vehicle apparatuses 2002 of the three vehicles N1, N2, and N3 is input, the optimal DB construction unit 2013f averages the reception intensities included in three new probe information to determine the reception intensity related to the traveling area of the mesh X.

The optimal DB construction unit 2013f determines 55 dB, which is the average value of three reception intensities of 60 dB, 55 dB, and 50 dB, as the reception intensity related to the broadcast channel with the frequency A in the traveling area of the mesh X and stores the reception intensity in the optimal DB 2012b.

The optimal DB construction unit 2013f transmits the area information stored in the optimal DB 2012b at a predetermined timing, thereby providing the area information.

As such, the optimal DB construction unit 2013f averages a plurality of reception intensities related to the same broadcast channel transmitted from the same traveling area. Then, the optimal DB construction unit 2013f stores, in the optimal DB 2012b, the average value as the average reception intensity of each broadcast channel in each traveling area. Therefore, it is possible to reduce the amount of area information managed in the optimal DB 2012b.

During the construction of the optimal DB 2012b, when there is a local region capable of receiving a predetermined broadcast channel in a given traveling area, the optimal DB construction unit 2013f calculates the percentage of the area of the region capable of receiving a broadcast channel in the area of the traveling area.

When the calculated percentage is less than a predetermined value, the optimal DB construction unit 2013f constructs the optimal DB 2012b such that the broadcast channel which can be received only in the local region capable of receiving a broadcast channel in a given traveling area cannot be received. In this way, it is possible to ensure that the broadcast channel determined to be receivable in the optimal DB 2012b can be reliably received.

Returning to FIG. 14, the in-vehicle apparatus 2002 includes a communication unit 2021, a storage unit 2022, and a control unit 2023. The communication unit 2021 is a communication interface that transmits/receives various kinds of information to/from the information providing apparatus 2001. The storage unit 2022 is a non-volatile information storage device that stores reception intensity information 2022a, position information 2022b, vehicle information 2022c, an optimal reception DB 2022d, and a broadcasting station name DB 2022e.

The reception intensity information 2022a indicates the reception intensity of each broadcast channel received by the in-vehicle apparatus 2002. The reception intensity information 2022a is input from a sensor 2003 that detects the electric field intensity of a broadcast signal received by an antenna.

The position information 2022b indicates the traveling position of a vehicle (for the vehicle provided with the in-vehicle apparatus 2002). The position information 2022b is input from a navigation apparatus 2004 having a function of specifying the position of the vehicle provided with the in-vehicle apparatus 2002 on the basis of signals received from a GPS (Global Positioning System) satellite and map information that is stored in advance.

The vehicle information 2022c includes information capable of identifying each vehicle, such as the registration number of the vehicle, and information capable of identifying the type or grade of each vehicle. The optimal reception DB 2022d stores area information related to the broadcast channels that can be received in the traveling area of the vehicle provided with the in-vehicle apparatus 2002.

The broadcasting station name DB 2022e stores information related to the name of each broadcasting station corresponding to each broadcast channel. The optimal reception DB 2022d is information received from the information providing apparatus 2001, and the broadcasting station name DB 2022e is information that is stored in the in-vehicle apparatus 2002 in advance.

The control unit 2023 is a processing unit that controls the overall operation of the in-vehicle apparatus 2002 and is formed by an information processing device including, for example, a CPU (Central Processing Unit), a ROM (Read Only Memory), and a RAM (Random Access Memory).

The control unit 2023 includes a probe information generating unit 2023a and a receivable channel setting unit 2023b which are implemented by the CPU to read various kinds of programs from the ROM and execute the programs using the RAM as a work area.

The probe information generating unit 2023a is a processing unit that reads the reception intensity information 2022a, the position information 2022b, and the vehicle information 2022c of each broadcast channel from the storage unit 2022 and associates the read information for each broadcast channel, thereby generating probe information for each broadcast channel. The probe information generating unit 2023a transmits the generated probe information to the information providing apparatus 2001 through the communication unit 2021 periodically or at the time when a broadcast is received.

The receivable channel setting unit 2023b is a processing unit that reads information stored in the optimal reception DB 2022d and the broadcasting station name DB 2022e from the storage unit 2022 and automatically sets a broadcast channel that can be received in the traveling area of the vehicle. For example, when the broadcast channel that has been received cannot be received due to the traveling of the vehicle, the receivable channel setting unit 2023b performs a network following process for automatic change to a broadcast channel that can be received in a the traveling area, which is a traveling destination.

When the traveling area in which the in-vehicle apparatus 2002 is positioned is changed due to the traveling of the vehicle provided with the in-vehicle apparatus, the receivable channel setting unit 2023b performs an area preset process of automatically setting, in the background, a plurality of broadcast channels that can be received in the traveling area, which is a traveling destination.

Figure 20:
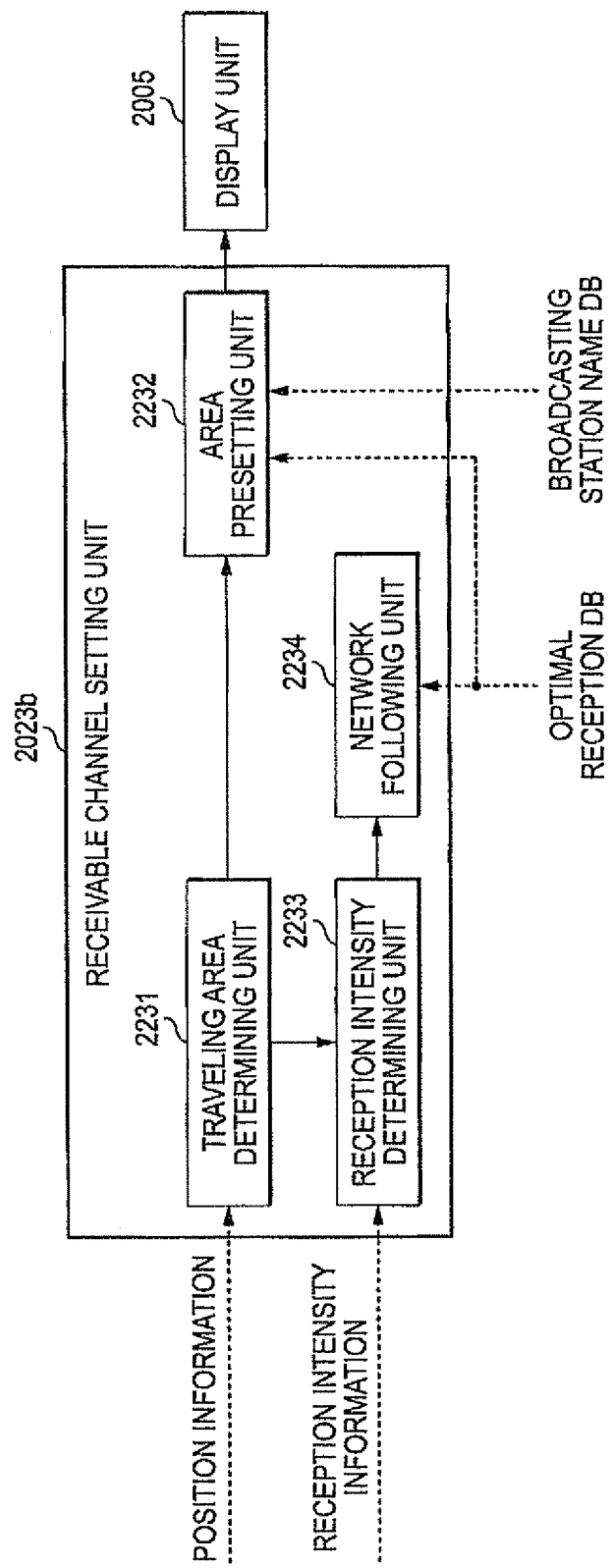
FIG. 20 is a block diagram illustrating the structure of a receivable channel setting unit according to the second embodiment.

Next, the structure and operation of the receivable channel setting unit 2023b will be described with reference to FIGS. 20 to 22. FIG. 20 is a block diagram illustrating the structure of the receivable channel setting unit 2023b according to the second embodiment. FIGS. 21A to 21C are diagrams illustrating the procedure of the area preset process according to the second embodiment and FIG. 22 is a diagram illustrating the procedure of the network following process according to the second embodiment.

As shown in FIG. 20, the receivable channel setting unit 2023b includes a traveling area determining unit 2231, an area presetting unit 2232, a reception intensity determining unit 2233, and a network following unit 2234.

The traveling area determining unit 2231 is a processing unit that determines the traveling area of the vehicle provided with the in-vehicle apparatus on the basis of the position information 2022b read from the storage unit 2022. The traveling area determining unit 2231 outputs the determination result of the traveling area to the area presetting unit 2232 and the reception intensity determining unit 2233.

The area presetting unit 2232 is a processing unit that performs the area preset process when a change in the traveling area of the vehicle is detected, on the basis of the determination result input from the traveling area determining unit 2231. The area presetting unit 2232 performs the area preset process using information read from the optimal reception DB 2022d and the broadcasting station name DB 2022e.

The area presetting unit 2232 controls the display unit 2005 to display the name of each broadcasting station corresponding to a predetermined number of broadcast channels subjected to the area preset process.

The reception intensity determining unit 2233 is a processing unit that determines the reception intensity of a broadcast of the broadcast channel that is currently being received, on the basis of the reception intensity information 2022a read from the storage unit 2022. The reception intensity determining unit 2233 outputs, to the network following unit 2234, information in which the determination result of the reception intensity is associated with the determination result of the traveling area input from the traveling area determining unit 2231.

The network following unit 2234 is a processing unit that performs the network following process when the broadcast channel that is currently being received cannot be received due to the entrance of the vehicle into the next traveling area at the traveling destination. The network following unit 2234 performs the network following process using information read from the optimal reception DB 2022d and the broadcasting station name DB 2022e.

Next, the procedure of the area preset performed by the area presetting unit 2232 will be described with reference to FIGS. 21A to 21C. A case in which the vehicle enters a traveling area corresponding to the mesh X will be described as an example. The area presetting unit 2232 can perform the area preset process even when a reduction in the reception intensity is detected during the traveling of the vehicle in the same traveling area.

Figures 21A, 21B, 21C:
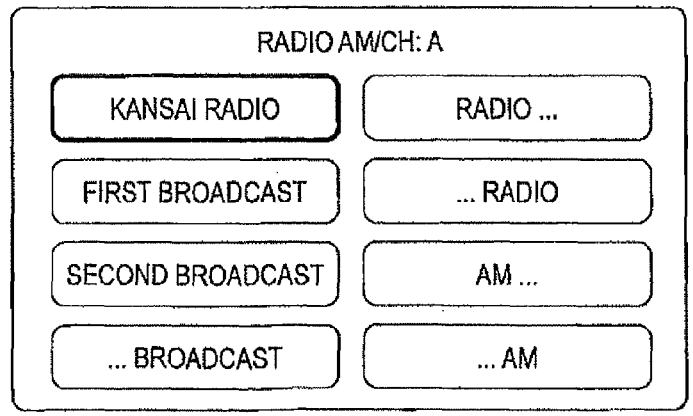
FIGS. 21A to 21C are diagrams illustrating the procedure of an area presetting process according to the second embodiment.
Figure 22:
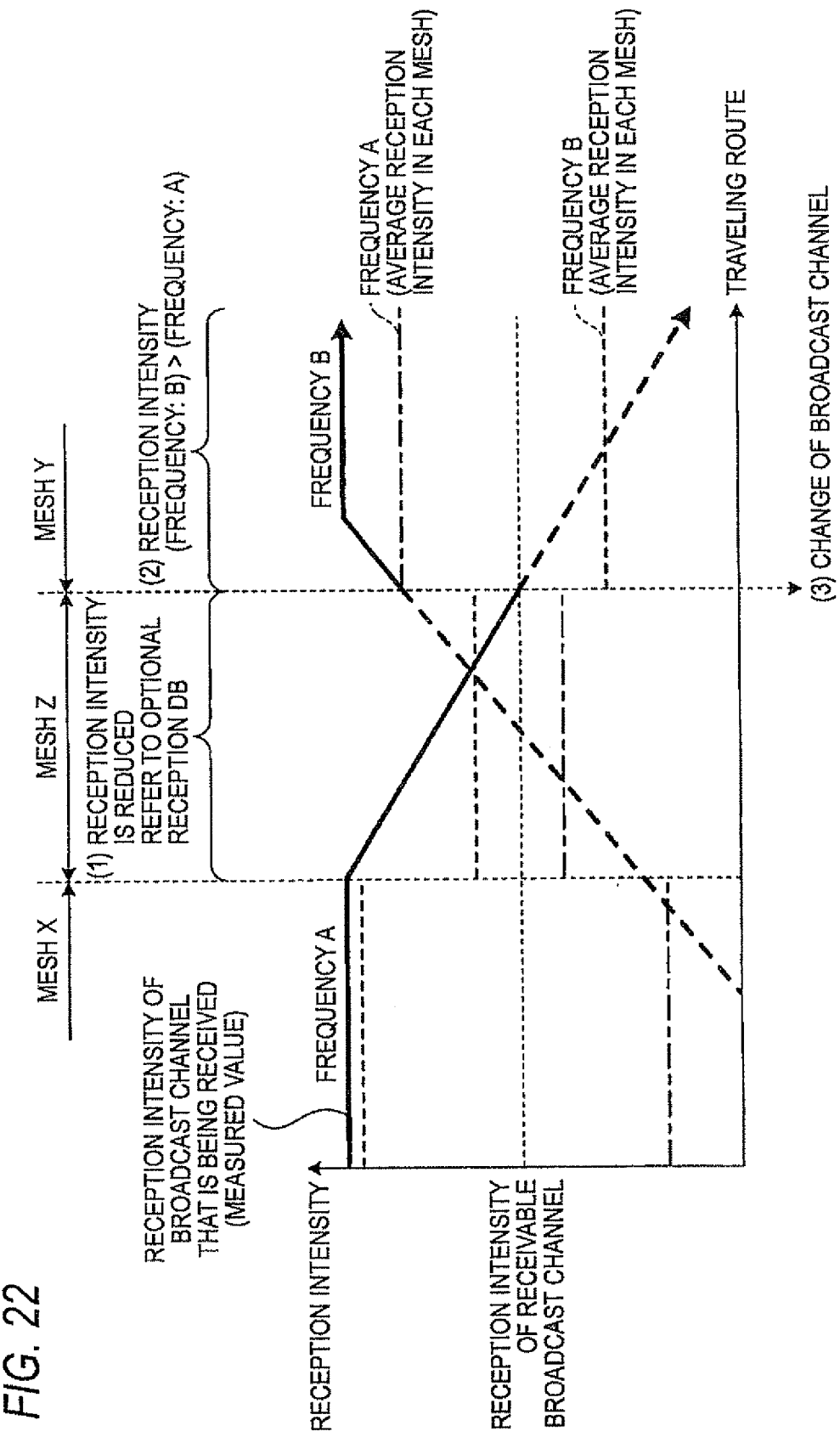
FIG. 22 is a diagram illustrating the procedure of a network following process according to the second embodiment.

When the vehicle enters a new traveling area of the mesh X from the current traveling area, the area presetting unit 2232 reads area information shown in FIG. 21A from the optimal reception DB 2022d. In addition, the area presetting unit 2232 reads a station name list shown in FIG. 21B from the broadcasting station name DB 2022e.

As shown in FIG. 21A, the area information related to the mesh X is a table in which the mesh ID of the mesh X, the kind of broadcast that can be received in the mesh X, a receivable frequency, reception intensity at each frequency, and a corresponding code are associated with each other. The corresponding code means an identification code peculiar to each frequency (broadcast channel).

As shown in FIG. 21B, the station name list related to the mesh X is a table in which a corresponding code, a broadcasting station name, reading 1, and reading 2 are associated with each other. The corresponding code is an identification code peculiar to each frequency (broadcast channel). Reading 1 and reading 2 are information indicating the reading of each of the station names of the broadcasting stations that use the same frequency, but have different station names depending on the location.

When the vehicle enters the mesh X at the traveling destination, the area presetting unit 2232 extracts the frequencies of a predetermined number of (for example, eight) broadcast channels from the area information of the mesh X in decreasing order of the reception intensity and sets the frequencies as receivable broadcast channels.

The area presetting unit 2232 extracts the same corresponding code as that corresponding to the frequency of each of the set broadcast channels from the station name list and selects each broadcasting station name associated with the extracted corresponding code.

As shown in FIG. 21C, the area presetting unit 2232 controls the display unit 2005 to display the selected station name. When the user sets reading 1 or reading 2 in advance, the area presetting unit 2232 outputs the selected reading as a voice during tuning.

As such, since the area presetting unit 2232 selects and sets the broadcast channels in the traveling area of the vehicle in decreasing order of the reception intensity, it is possible to set an appropriate broadcast channel in each traveling area.

In addition, since the area information referred to by the area presetting unit 2232 to perform the area preset process is updated using only the probe information determined to be valid by the information providing apparatus 2001, the reliability of the area information is high. Therefore, the area presetting unit 2232 can select the broadcast channel that can be reliably received in each traveling area and perform the area preset process.

As described above, the in-vehicle apparatus 2002 stores the broadcasting station name DB 2022*e* in advance. The area presetting unit 2232 checks the area information and each corresponding code of the station name list and can extract a broadcasting station name corresponding to each broadcast channel.

Therefore, even when the area information received from the information providing apparatus 2001 does not include, for example, the broadcasting station name or reading, the in-vehicle apparatus 2002 can extract a broadcasting station name corresponding to each broadcast channel. Therefore, it is possible to reduce the amount of information received by the in-vehicle apparatus 2002 from the information providing apparatus 2001 and thus reduce a communication charge.

Next, the procedure of the network following process performed by the network following unit 2234 will be described with reference to FIG. 22. A case in which, after the vehicle enters a mesh Z from the mesh X, the reception intensity related to the broadcast with a frequency A that is currently being received is reduced will be described as an example.

It is assumed that the average reception intensity of the frequency A in the area information of the mesh X is higher than the average reception intensity of a frequency B and the average reception intensity of the frequency B in the information of a mesh Y is higher than the average reception intensity of the frequency A.

In addition, it is assumed that the average reception intensity of the frequency A in area information is reduced in stages in the order of the mesh X, the mesh Z, and the mesh Y and the average reception intensity of the frequency B in each area information increases in stages in the order of the mesh X, the mesh Z, and the mesh Y.

As shown in FIG. 22, when the network following unit 2234 detects that the reception intensity of the broadcast received at the frequency A has been reduced after the entrance of the vehicle from the mesh X to the mesh Z, it refers to the optimal reception DB 2022*d* (see (1) of FIG. 22).

Before the vehicle enters the mesh Y at the traveling destination, the network following unit 2234 reads the area information related to the mesh Y from the optimal reception DB 2022*d* and searches for a broadcast channel to be set in the mesh Y.

Specifically, first, the network following unit 2234 searches for another broadcasting station belonging to the same broadcasting group as the broadcasting station that transmits broadcasts at the frequency A from the station name list of the mesh Y. Then, the network following unit 2234 extracts the corresponding code associated with the searched broadcasting station from the station name list of the mesh Y.

Then, the network following unit 2234 reads the area information related to the mesh Y and searches for the frequency associated with the same corresponding code as that extracted from the station name list of the mesh Y from the area information of the mesh Y. Here, it is assumed that the frequency B is searched.

It is assumed that the network following unit 2234 determines that the reception intensity associated with the frequency B in the area information of the mesh Y is higher than the reception intensity associated with the frequency A (see (2) of FIG. 22).

Then, the network following unit 2234 changes the broadcast channel to be received when the vehicle enters the mesh Y from the mesh Z from the frequency A to the frequency B, thereby performing the network following process (see (3) of FIG. 22).

As such, since the network following unit 2234 searches for the broadcast channel to be set in the mesh Y in advance before the vehicle enters the mesh Y, it is possible to rapidly change the broadcast channel from the frequency A to the frequency B after the vehicle enters the mesh Y.

In addition, since the area information referred to by the network following unit 2234 to perform the network following process is updated using only the probe information determined to be valid by the information providing apparatus 2001, the reliability of the area information is high. Therefore, when the vehicle enters the mesh Y, the network following unit 2234 can accurately select a receivable broadcast channel and perform the network following process.

Even when there is no variation in the reception intensity corresponding to the broadcast that is being received, the network following unit 2234 may search for the broadcast channel that can be received in a traveling area at the traveling destination.

In this way, even when the vehicle enters the mesh Y from the mesh X shown in FIGS. 21A to 21C without passing through the mesh Z, the network following unit 2234 can accurately change the broadcast channel to, for example, the frequency B that can be received after the vehicle enters the mesh Y.

Figure 23:
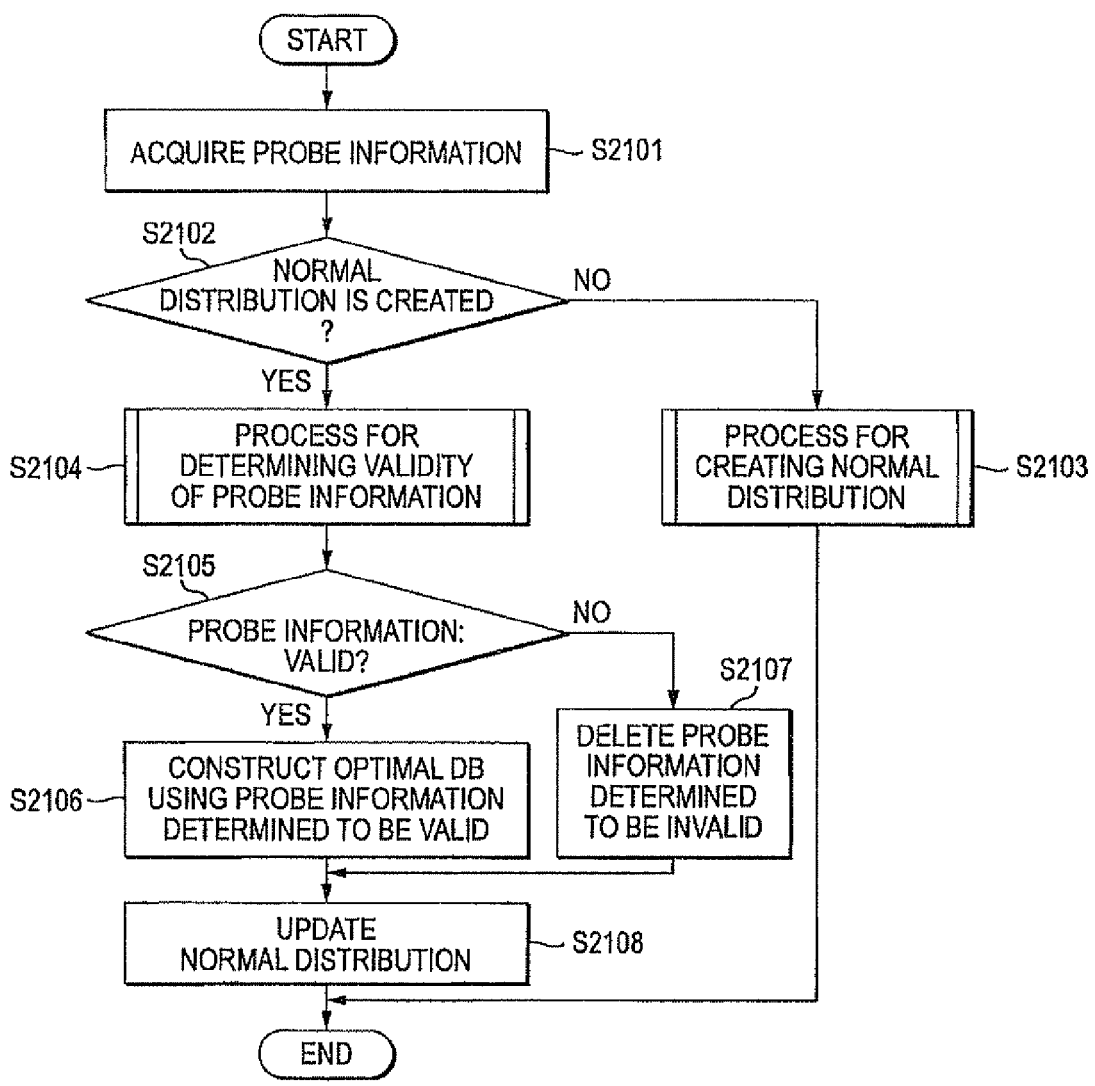
FIG. 23 is a flowchart illustrating the procedure of a process for constructing an optimal DB according to the second embodiment.
Figure 24:
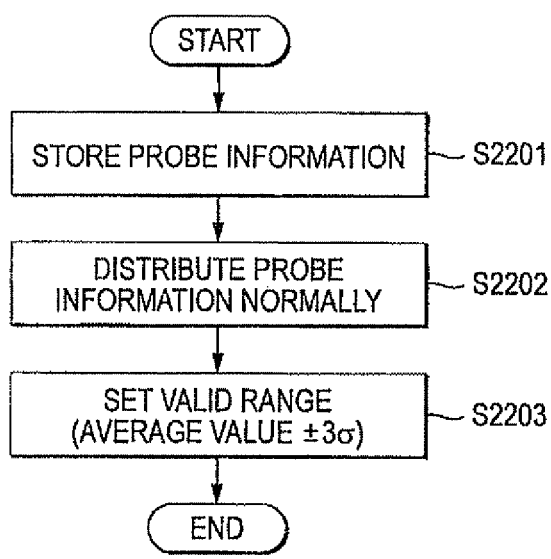
FIG. 24 is a flowchart illustrating the procedure of a process for creating a normal distribution according to the second embodiment.
Figure 25:
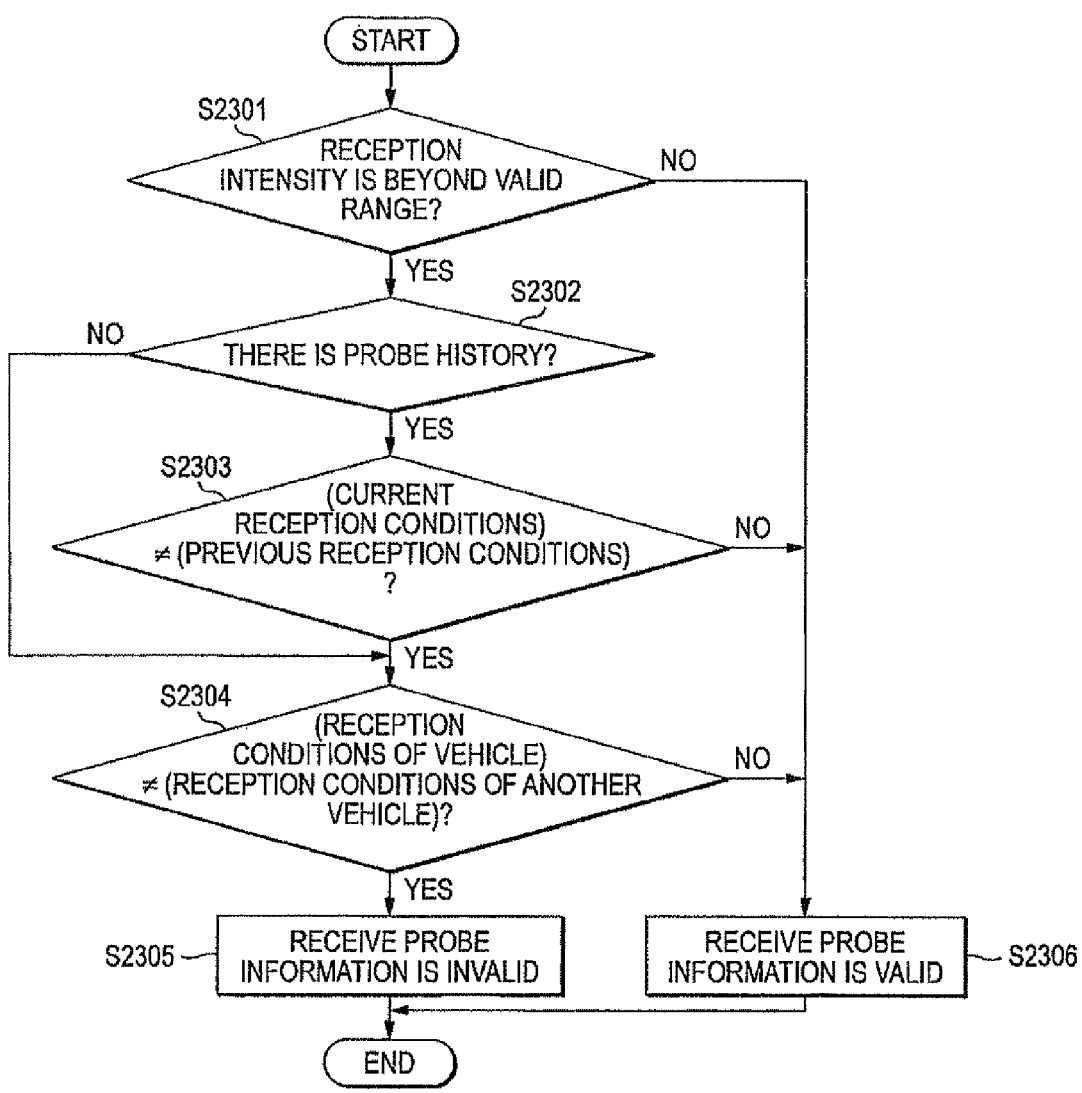
FIG. 25 is a flowchart illustrating the procedure of a process for determining the validity of probe information according to the second embodiment.

Next, the procedure performed by the control unit 2013 of the information providing apparatus 2001 will be described with reference to FIGS. 23 to 25. FIG. 23 is a flowchart illustrating the procedure of a process of constructing an optimal DB according to the second embodiment, FIG. 24 is a flowchart illustrating the procedure of a process of creating a normal distribution according to the second embodiment, and FIG. 25 is a flowchart illustrating the procedure of a process of determining the validity of probe information according to the second embodiment. FIGS. 23 to 25 show only a process related to the construction of the optimal DB in the procedure performed by the control unit 2013.

Next, the process of constructing an optimal DB, the process of creating a normal distribution, and the process of determining the validity of probe information will be described in this order. In the following description, new probe information is simply referred to as probe information.

As shown in FIG. 23, when the information providing apparatus 2001 is turned on, the control unit 2013 starts the process of constructing the optimal DB. When the process of constructing the optimal DB starts, the control unit 2013 acquires probe information from the probe history 2012*a* (Step S2101). Then, the control unit 2013 determines whether a normal distribution has been created (Step S2102).

When it is determined that the normal distribution has not been created (Step S2102, No), the control unit 2013 performs the process of creating the normal distribution shown in FIG. 24 (Step S2103) and then ends the process.

When it is determined that the normal distribution has been created (Step S2102, Yes), the control unit 2013 performs the process of determining the validity of probe information shown in FIG. 25 (Step S2104). Then, as a result of the process of determining the validity of probe information, the control unit 2013 determines whether the probe information is valid (Step S2105).

When it is determined that the probe information is invalid (Step S2105, No), the control unit 2013 deletes the probe information determined to be invalid from the probe history 2012a (Step S2107) and the process proceeds to Step S2108.

When it is determined that the probe information is valid (Step S2105, Yes), the control unit 2013 constructs the optimal DB 2012b using the probe information determined to be valid (Step S2106).

Then, the control unit 2013 performs a process of updating the normal distribution with the storage of the probe information determined to be valid or the deletion of the probe information determined to be invalid (Step S2108) and ends the process. Then, the control unit 2013 repeatedly performs Steps S2101 to S2108 during the period for which the information providing apparatus 2001 is turned on.

Next, the process of creating a normal distribution performed by the control unit 2013 in Step S2103 will be described. As shown in FIG. 24, when the process of creating a normal distribution starts, first, the control unit 2013 stores the probe information received from each in-vehicle apparatus 2002 in the probe history 2012a (Step S2201).

Then, the control unit 2013 distributes normally the reception intensity of the probe information stored in the probe history 2012a to create a normal distribution (Step S2202). Then, the control unit 2013 calculates the average value of the reception intensity in the created normal distribution and sets the range of the calculated average value±σ as the valid range (Step S2203) and ends the process.

Next, the process of determining the validity of probe information performed by the control unit 2013 in Step S2104 will be described. As shown in FIG. 25, when the process of determining the validity of probe information starts, first, the control unit 2013 determines whether the reception intensity of the probe information is beyond the valid range set in the normal distribution (Step S2301).

When it is determined that the reception intensity is within the valid range (Step S2301, No), the control unit 2013 determines that the received probe information is valid (Step S2306) and ends the process. When it is determined that the reception intensity is beyond the valid range (Step S2301, Yes), the control unit 2013 determines whether there is a previous probe history 2012a related to the in-vehicle apparatus 2002 transmitting the probe information (Step S2302).

When the control unit 2013 determines that there is no probe history 2012a (Step S2302, No), the process proceeds to Step S2304. When it is determined that there is the probe history 2012a (Step S2302, Yes), the control unit 2013 determines whether the current and previous reception conditions of the in-vehicle apparatus 2002 transmitting the probe information are different from each other (Step S2303).

When it is determined that the current and previous reception conditions are identical to each other (Step S2303, No), the control unit 2013 determines that the received probe information is valid (Step S2306) and ends the process.

When it is determined that the current and previous reception conditions are different from each other (Step S2303, Yes), the control unit 2013 determines whether the reception conditions of the vehicle, which is the transmission source of the received probe information, are different from those of another vehicle that receives the same broadcast channel lately in the traveling area from which the received probe information is transmitted (Step S2304).

When it is determined that the reception conditions of the vehicle are identical to those of another vehicle (Step S2304, No), the control unit 2013 determines that the received probe information is valid (Step S2306) and ends the process. When it is determined that the reception conditions of the vehicle are different from those of another vehicle (Step S2304, Yes), the control unit 2013 determines that the received probe information is invalid (Step S2305) and ends the process.

As such, in the broadcast receiving system 2100, the information providing apparatus 2001 determines the validity of each probe information received from each in-vehicle apparatus 2002, deletes the probe information determined to be invalid, and constructs the optimal DB 2012b using only the probe information determined to be valid. Therefore, it is possible to improve the reliability of the optimal DB 2012b.

In the second embodiment, when reading the probe information compared with the new probe information from the probe history 2012a, the vehicle history comparing/determining unit 2013d and the all-vehicle history comparing/determining unit 2013e read the probe information related to the same broadcast channel transmitted from the same traveling area as that from which the new probe information is transmitted. However, the vehicle history comparing/determining unit 2013d and the all-vehicle history comparing/determining unit 2013e may read the following probe information.

That is, the vehicle history comparing/determining unit 2013d and the all-vehicle history comparing/determining unit 2013e may read probe information transmitted from a sub-area including the position where new probe information is transmitted, among the sub-areas divided from the traveling area from which the new probe information is transmitted.

As such, when the probe information transmitted from the sub-area including the position where new probe information is transmitted is read, it is possible to determine the reception conditions of the in-vehicle apparatuses 2002 provided in the vehicle and other vehicles in the range narrower than the area from which the new probe information is transmitted. Therefore, it is possible to more strictly determine the reliability of new probe information.

Figure 26:
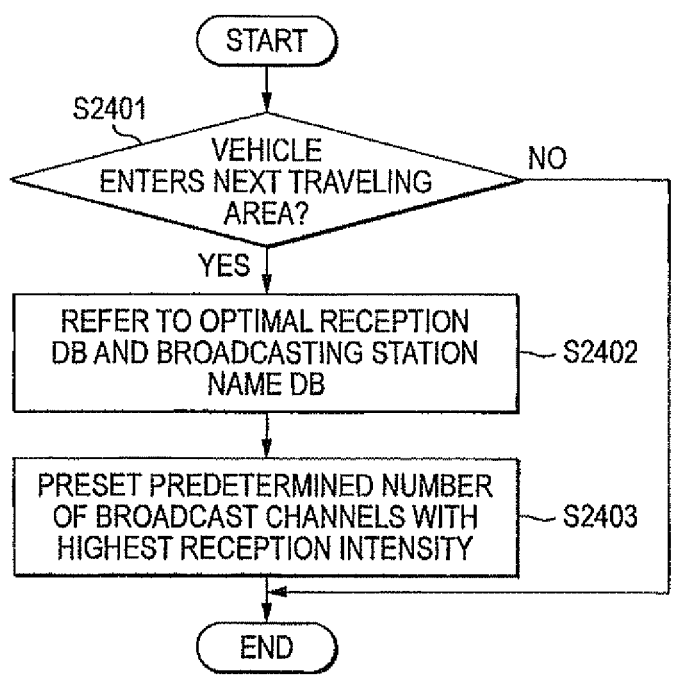
FIG. 26 is a flowchart illustrating the procedure of the area presetting process according to the second embodiment.

Next, the procedure of the area preset process performed by the in-vehicle apparatus 2002 will be described with reference to FIG. 26. FIG. 26 is a flowchart illustrating the procedure of the area preset process according to the second embodiment.

As shown in FIG. 26, the control unit 2023 of the in-vehicle apparatus 2002 determines whether the vehicle provided with the in-vehicle apparatus 2002 enters the next traveling area at the traveling destination (Step S2401). When it is determined that the vehicle does not enter the next traveling area (Step S2401, No), the control unit 2023 ends the process.

On the other hand, when the vehicle enters the next traveling area (Step S2401, Yes), the control unit 2023 refers to the optimal reception DB 2022d and the broadcasting station name DB 2022e (Step S2402). Then, the control unit 2023 selects a predetermined number of broadcast channels with the highest reception intensity from the area information stored in the optimal reception DB 2022d, performs the area preset process (Step S2403), and ends the process.

Figure 27:
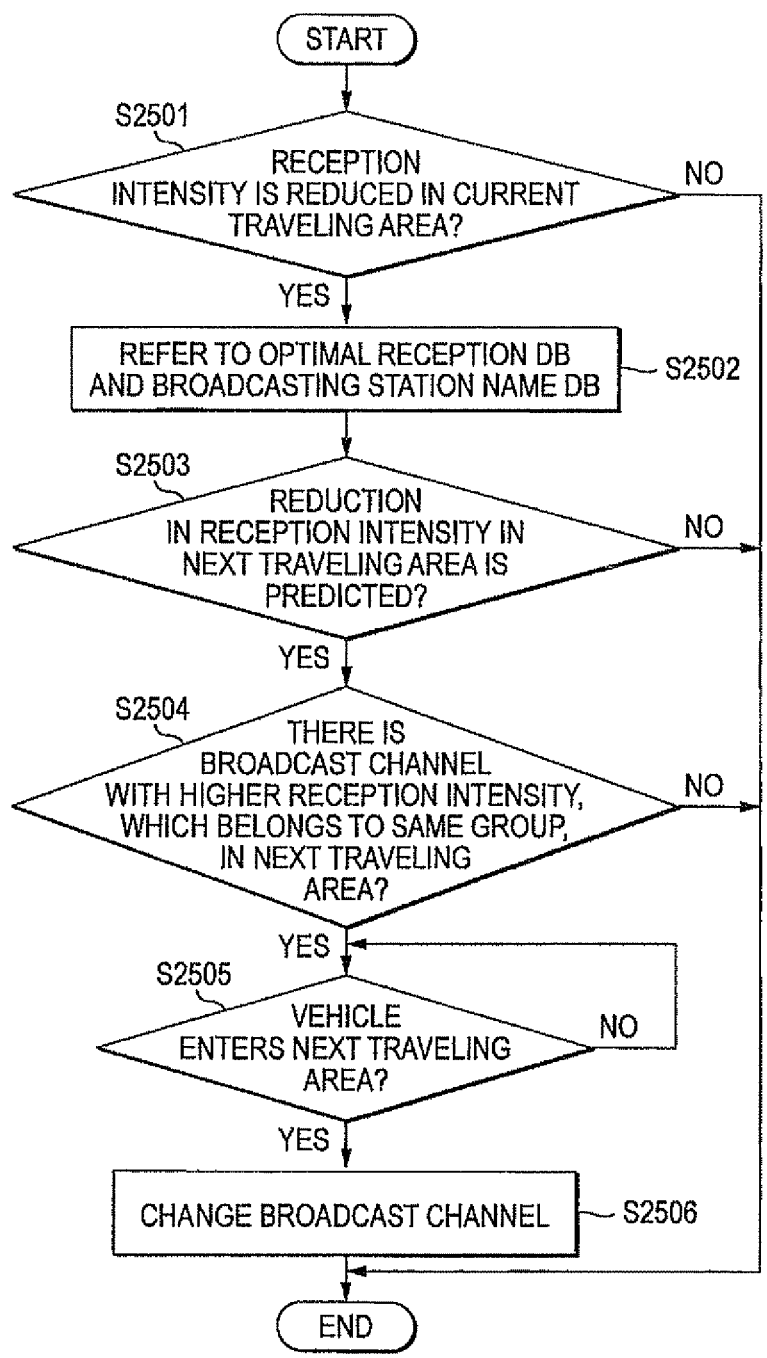
FIG. 27 is a flowchart illustrating the procedure of the network following process according to the second embodiment.

Next, the procedure of the network following process performed by the in-vehicle apparatus 2002 will be described with reference to FIG. 27. FIG. 27 is a flowchart illustrating the procedure of the network following process according to the second embodiment.

As shown in FIG. 27, the control unit 2023 of the in-vehicle apparatus 2002 determines whether the reception intensity of the broadcast channel received in the traveling area in which the vehicle provided with the in-vehicle apparatus 2002 is currently traveling is reduced (Step S2501). When it is determined that the reception intensity is not reduced (Step S2501, No), the control unit 2023 ends the process.

On the other hand, when it is determined that the reception intensity is reduced (Step S2501, Yes), the control unit 2023 refers to the optimal reception DB 2022d and the broadcasting station name DB 2022e (Step S2502).

Then, the control unit 2023 determines whether to predict a reduction in the reception intensity in the next traveling area at the traveling destination, on the basis of the area information of the optimal reception DB 2022d referred to in Step S2502 (Step S2503). When it is determined that it is difficult to predict a reduction in the reception intensity (Step S2503, No), the control unit 2023 ends the process.

On the other hand, when it is determined that it is possible to predict a reduction in the reception intensity (Step S2503, Yes), the control unit 2023 determines whether there is a broadcast channel with higher reception intensity, which belongs to the same group (belonging to the same broadcasting group), in the next traveling area, on the basis of the station name list in the broadcasting station name DB 2022e referred to in Step S2502 (Step S2504).

When it is determined that there is no broadcast channel belonging to the same group (Step S2504, No), the control unit 2023 ends the process. On the other hand, when it is determined that there is a broadcast channel belonging to the same group (Step S2504, Yes), the control unit 2023 determines whether the vehicle provided with the in-vehicle apparatus 2002 enters the next traveling area (Step S2505).

The control unit 2023 repeatedly performs the determination process of Step S2505 until the vehicle enters the next traveling area (Step S2505, No). When it is determined that the vehicle enters the next traveling area (Step S2505, Yes), the control unit 2023 changes a broadcast channel to be received to the broadcast channel searched in Step S2504 (Step S2506) and ends the process.

When it is determined in Step S2504 that there is no broadcast channel belonging to the same group and the vehicle enters the next traveling area, the control unit 2023 may change the broadcast channel to be received to a receivable broadcast channel belonging to another group.

As described above, in the broadcast receiving system 2100 according to the second embodiment, the in-vehicle apparatus 2002 performs the area preset process and the network following process using the area information of the optimal DB 2012b with high reliability that is constructed by the information providing apparatus 2001. Therefore, the in-vehicle apparatus 2002 can set an appropriate broadcast channel in each traveling area of the vehicle provided with the vehicle apparatus 2002.

Next, a modification of the network following process performed by the in-vehicle apparatus 2002 will be described with reference to FIGS. 28 and 29. In this modification, a network following process performed when the in-vehicle apparatus 2002 does not store the optimal reception DB 2022d will be described.

Figure 28:
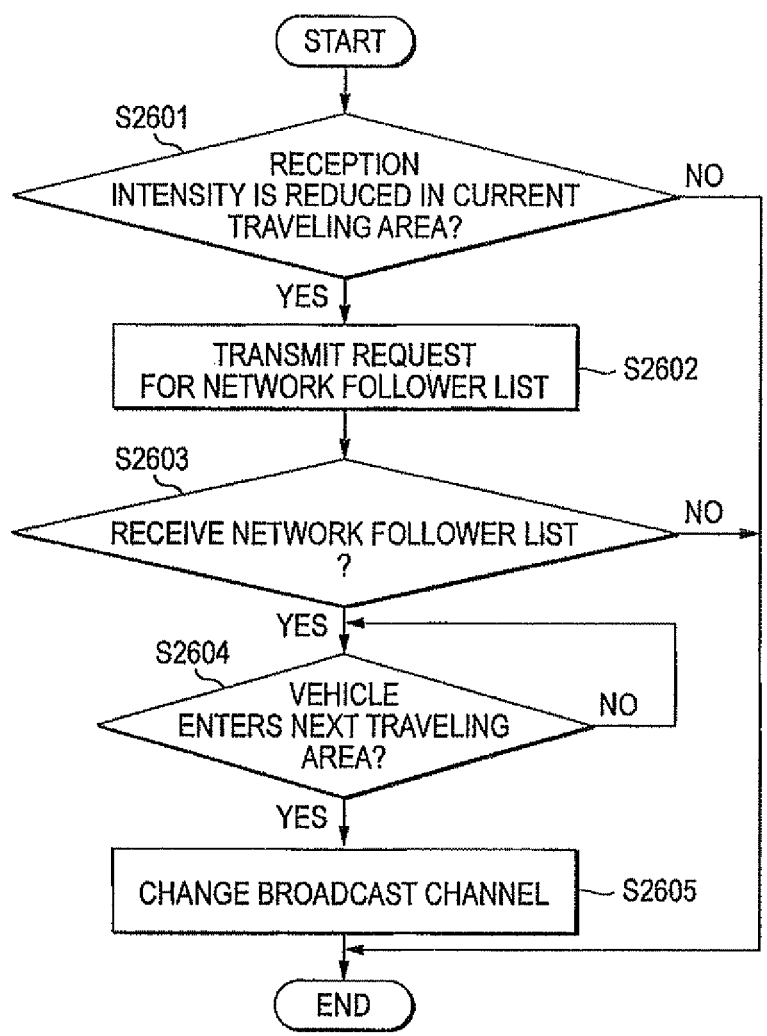
FIG. 28 is a flowchart illustrating the procedure of a network following process according to a modification of the second embodiment.
Figure 29:
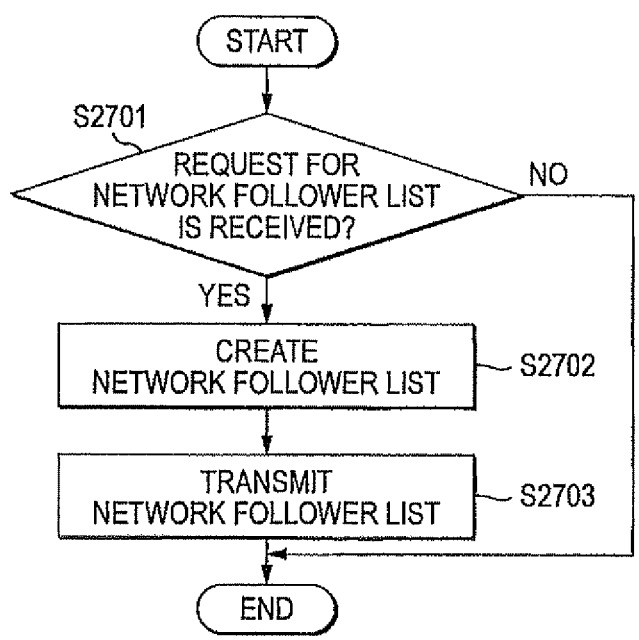
FIG. 29 is a flowchart illustrating a process performed by the information providing apparatus in order to implement the network following process according to this modification.

FIG. 28 is a flowchart illustrating the procedure of the network following process according to this modification, and FIG. 29 is a flowchart illustrating a process performed by the information providing apparatus 2001 in order to implement the network following process according to this modification.

In this modification, as shown in FIG. 28, the control unit 2023 of the in-vehicle apparatus 2002 determines whether the reception intensity of the broadcast channel received in the traveling area in which the vehicle provided with the in-vehicle apparatus 2002 is currently traveling is reduced (Step S2601). When it is determined that the reception intensity is not reduced (Step S2601, No), the control unit 2023 ends the process.

On the other hand, when it is determined that the reception intensity is reduced (Step S2601, Yes), the control unit 2023 transmits a request for a network follower list to the information providing apparatus 2001 (Step S2602). The network follower list means a list of broadcast channels to be set as the broadcast channels received when the vehicle enters the next traveling area at the traveling destination.

The control unit 2023 transmits a request including information indicating the position of the vehicle, a traveling route, and the broadcast channel that is being received to the information providing apparatus 2001. Then, the control unit 2023 determines whether the network follower list is received from the information providing apparatus 2001 (Step S2603).

For example, when the network follower list is not received within a predetermined period of time (Step S2603, No), the control unit 2023 ends the process. On the other hand, when the network follower list is received (Step S2603, Yes), the control unit 2023 determines whether the vehicle enters the next traveling area (Step S2604).

The control unit 2023 repeatedly performs Step S2604 until the vehicle enters the next traveling area (Step S2604, No). When it is determined that the vehicle enters the next traveling area (Step S2604, Yes), the control unit 2023 changes the broadcast channel to be received on the basis of the network follower list (Step S2605), and ends the process.

Next, a process performed by the information providing apparatus 2001 in order to implement the procedure of the network following process according to this modification will be described with reference to FIG. 29. As shown in FIG. 29, the control unit 2013 of the information providing apparatus 2001 determines whether a request for the network follower list is received from the in-vehicle apparatus 2002 (Step S2701).

When it is determined that the request for the network follower list is not received (Step S2701, No), the control unit 2013 ends the process. On the other hand, when it is determined that the request for the network follower list is received (Step S2701, Yes), the control unit 2013 creates a network list (Step S2702).

The control unit 2013 searches for area information related to the next traveling area on the traveling route from the optimal DB 2012b on the basis of information indicating the position of the vehicle, the traveling route, and the broadcast channel included in the request received from the in-vehicle apparatus 2002.

Then, the control unit 2013 selects the broadcast channels belonging to the the same broadcasting group as the broadcast channel received by the in-vehicle apparatus 2002 from the searched area information in decreasing order of the reception intensity, thereby creating a network follower list.

Then, the control unit 2013 transmits the created network follower list to the in-vehicle apparatus 2002, which is a request transmission source (Step S2703), and ends the process.

As such, in this modification, the in-vehicle apparatus 2002 can perform the network following process on the basis of the network follower list received from the information providing apparatus 2001. Therefore, the in-vehicle apparatus 2002 does not need to store the optimal reception DB 2022d.

In addition, since the network follower list is information with high reliability that is created by the information providing apparatus 2001, the in-vehicle apparatus 2002 can reliably set a receivable broadcast channel during the network following process.

What is claimed is:

1. A database construction system that constructs a database storing broadcast channels which are receivable in each area, the data base construction system comprising:
a receiving unit that receives probe information from a plurality of broadcast receiving apparatuses, the probe information including reception intensity of each of the broadcast channels and positions of the broadcast receiving apparatuses;
an information storage unit that stores the probe information received by the receiving unit;
an extracting unit that extracts a probe information with same broadcast channel as that of new probe information, which is the probe information newly received by the receiving unit, among the probe information transmitted from a transmission area of the new probe information, from the information storage unit;
a determining unit that determines whether the new probe information is valid on the basis of the reception intensity included in the probe information extracted by the extracting unit and the reception intensity included in the new probe information; and
a database update unit that updates the database using the new probe information that is determined to be valid by the determining unit.

2. The database construction system as set forth in claim 1, further comprising:
a distribution generating unit that generates distribution of the reception intensity included in the probe information with the same broadcast channel as that of the new probe information among the probe information transmitted from the transmission area of the new probe information; and
a setting unit that sets a predetermined valid range of the reception intensity for the distribution generated by the distribution generating unit,
wherein the determining unit determines that the new probe information is valid when the reception intensity included in the new probe information is within the valid range.

3. The database construction system as set forth in claim 1, further comprising:
a first state determining unit that determines latest reception conditions of the broadcast receiving apparatus, which is a transmission source of the new probe information, on the basis of the reception intensity included in the new probe information; and
a second state determining unit that determines previous reception conditions of the broadcast receiving apparatus, which is the transmission source of the new probe information, on the basis of the reception intensity included in the probe information transmitted from the same transmission area as that from which the new probe information is transmitted, among the probe information transmitted from the broadcast receiving apparatus,
wherein the determining unit determines that the new probe information is valid when the determination result of the first state determining unit is the same as that of the second state determining unit.

4. The database construction system as set forth in claim 3, further comprising:
a third state determining unit that determines reception conditions of the broadcast receiving apparatuses other than the broadcast receiving apparatus which is the transmission source of the new probe information, on the basis of the reception intensity included in the probe information transmitted from the same transmission area as that from which the new probe information is transmitted,
wherein the determining unit determines that the new probe information is valid when the determination result of the first state determining unit is the same as that of the third state determining unit.

5. The database construction system as set forth in claim 1, further comprising:
an averaging unit that averages the reception intensity included in the probe information which is stored in the information storage unit for each broadcast channel in each transmission area of the probe information,
wherein the database update unit determines the reception intensity averaged by the averaging unit as the reception intensity of each broadcast channel in each transmission area and updates the database.

6. A broadcast receiving system comprising:
a plurality of in-vehicle apparatuses each of which is provided in a vehicle and receives a broadcast; and
an information providing apparatus that transmits area information related to broadcast channels which are receivable in a traveling area of the vehicle to the in-vehicle apparatuses,
wherein the information providing apparatus includes:
a receiving unit that receives probe information including reception intensity of each of the broadcast channels and a position of the vehicle from the in-vehicle apparatuses;
a determining unit that determines validity of probe information which is newly received by the receiving unit, on the basis of the reception intensity included in the newly received probe information and the reception intensity included in the probe information which has been received from the traveling area from which the newly received probe information is transmitted; and
an update unit that updates the area information using the new probe information determined to be valid by the determining unit, and
wherein each of the in-vehicle apparatuses includes:
an area information receiving unit that receives the area information from the information providing apparatus;
an area determining unit that determines the traveling area of the vehicle; and
a setting unit that sets the broadcast channels which are receivable in the traveling area determined by the area determining unit, on the basis of the area information received by the area information receiving unit.

7. The broadcast receiving system as set forth in claim 6, wherein when the area determining unit determines that the traveling area of the vehicle is changed, the setting unit of each of the in-vehicle apparatuses sets the broadcast channels extracted from the area information related to the changed traveling area.

8. The broadcast receiving system as set forth in claim 7, wherein in the area information, the broadcast channels which are receivable in each traveling area are associated with the reception intensity of the broadcast channels, and
wherein when the broadcast channel is extracted from the area information, the setting unit of each of the in-vehicle apparatuses extracts the broadcast channels in decreasing order of the reception intensity.

9. The broadcast receiving system as set forth in claim 6,
wherein in the area information, a unique identification code is associated with each of the broadcast channels, and
wherein each of the in-vehicle apparatuses further includes:
- a table storage unit that stores a table in which names of broadcasting stations using the broadcast channels are associated with the identification codes of the broadcast channels; and
- a station name extracting unit that extracts the identification code corresponding to the broadcast channels from the area information and extracts the names of the broadcasting stations corresponding to the identification code from the table.

10. The broadcast receiving system as set forth in claim 6,
wherein in the area information, the broadcast channels which are receivable in each traveling area are associated with the reception intensity of the broadcast channels,
wherein each of the in-vehicle apparatuses further includes a search unit that searches for another broadcast channel capable of receiving the same broadcast as the broadcast channel which is currently being received with a higher reception intensity in the traveling area at a traveling destination, from the area information, before the vehicle enters the traveling area at the traveling destination, and
wherein when the area determining unit determines that the traveling area of the vehicle is changed to the traveling area at the traveling destination, the setting unit of each of the in-vehicle apparatuses sets a broadcast channel to be received, on the basis of the search result of the search unit.

11. The broadcast receiving system as set forth in claim 6,
wherein each of the in-vehicle apparatuses further includes a request transmitting unit that transmits a request for the area information related to a broadcast channel to be set in the traveling area at a traveling destination to the information providing apparatus before the vehicle enters the traveling area at the traveling destination, and
wherein when the area determining unit determines that the traveling area of the vehicle is changed to the traveling area at the traveling destination, the setting unit of each of the in-vehicle apparatuses sets a broadcast channel to be received, on the basis of the area information related to the broadcast channel to be set, which is received by the area information receiving unit.

* * * * *